(12) United States Patent
Miao

(10) Patent No.: US 11,311,930 B2
(45) Date of Patent: Apr. 26, 2022

(54) METHOD OF FORGING OUTER JOINT MEMBER OF CONSTANT VELOCITY UNIVERSAL JOINT

(71) Applicant: NTN CORPORATION, Osaka (JP)

(72) Inventor: Jia Hua Miao, Shizuoka (JP)

(73) Assignee: NTN CORPORATION, Osaka (JP)

( * ) Notice: Subject to any disclaimer, the term of this patent is extended or adjusted under 35 U.S.C. 154(b) by 715 days.

(21) Appl. No.: 16/077,191

(22) PCT Filed: Jan. 25, 2017

(86) PCT No.: PCT/JP2017/002490
§ 371 (c)(1),
(2) Date: Aug. 10, 2018

(87) PCT Pub. No.: WO2017/141647
PCT Pub. Date: Aug. 24, 2017

(65) Prior Publication Data
US 2021/0053106 A1 Feb. 25, 2021

(30) Foreign Application Priority Data
Feb. 16, 2016 (JP) .............................. JP2016-026911

(51) Int. Cl.
*B21J 5/12* (2006.01)
*B21K 1/76* (2006.01)

(52) U.S. Cl.
CPC ................. *B21J 5/12* (2013.01); *B21K 1/762* (2013.01); *Y10T 29/49636* (2015.01); *Y10T 29/49689* (2015.01); *Y10T 29/49945* (2015.01)

(58) Field of Classification Search
CPC ......... B21J 5/12; B21J 5/06; B21J 9/06; B21J 13/02; B21J 13/03; B21K 1/762;
(Continued)

(56) References Cited

U.S. PATENT DOCUMENTS 4,453,395 A * 6/1984 Takeda ................... B21D 53/84
72/348
4,559,803 A * 12/1985 Langford ............... B21K 1/762
72/114
(Continued)

FOREIGN PATENT DOCUMENTS

JP 9-150233 6/1997
JP 2002-346688 12/2002

OTHER PUBLICATIONS

International Search Report dated Apr. 25, 2017 in International (PCT) Application No. PCT/JP2017/002490.
(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A method is used to forge an outer joint member of a constant velocity universal joint. Track grooves of the outer and inner joint members each have an arc-shaped ball raceway center line having a curvature center that is not offset in an axial direction with respect to a joint center. The forging method includes performing ironing by press-fitting a cylindrical portion of one end of a shaft portion of a pre-processing material of the outer joint member including the shaft portion and the cylindrical portion into a die hole of a die while a punch set that is radially expandable and contractable is fitted to an inner peripheral surface of the cylindrical portion. The punch set includes punches and a punch base to guide the punches to enable advancing and retreating. Each of the punches has a pair of forming surfaces for forming the adjacent track grooves.

6 Claims, 25 Drawing Sheets

(58) Field of Classification Search
CPC ... B21K 1/763; B21K 1/765; Y10T 29/49636; Y10T 29/49689; Y10T 29/49945
USPC .................................... 29/898, 898.066, 525
See application file for complete search history.

(56) References Cited

U.S. PATENT DOCUMENTS

| | | | |
|---|---|---|---|
| 5,765,430 | A | 6/1998 | Iihara et al. |
| 6,205,828 | B1* | 3/2001 | Nagao ........................ B21J 9/12 72/19.9 |
| 6,406,374 | B1* | 6/2002 | Kanamaru ........... B21D 26/047 403/359.1 |
| 6,506,122 | B2* | 1/2003 | Nakagawa ............ F16D 3/2237 464/145 |
| 11,020,784 | B2* | 6/2021 | Friese .................... B21D 22/16 |
| 2003/0213277 | A1* | 11/2003 | Nagao ..................... B21J 13/14 72/354.8 |
| 2008/0184765 | A1* | 8/2008 | Jiahua .................... B21K 1/762 72/360 |
| 2010/0227695 | A1* | 9/2010 | Suzuki .................. B21K 1/761 464/141 |
| 2011/0003645 | A1* | 1/2011 | Ooba ....................... C21D 7/04 464/139 |
| 2011/0269556 | A1* | 11/2011 | Kobayashi ............ F16D 3/2245 464/141 |
| 2012/0165105 | A1* | 6/2012 | Fujio ....................... F16D 3/224 464/145 |
| 2013/0109483 | A1* | 5/2013 | Yoshida ............... C10M 169/06 464/145 |
| 2021/0062860 | A1* | 3/2021 | Park ....................... B60B 35/14 |

OTHER PUBLICATIONS

International Preliminary Report on Patentability and Written Opinion of the International Searching Authority dated Aug. 21, 2018 in International (PCT) Patent Application No. PCT/JP2017/002490.

* cited by examiner

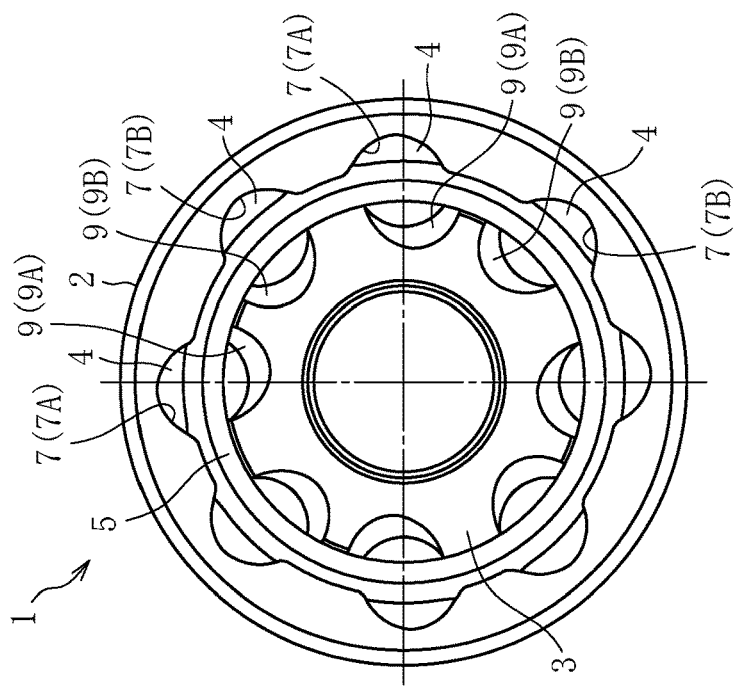
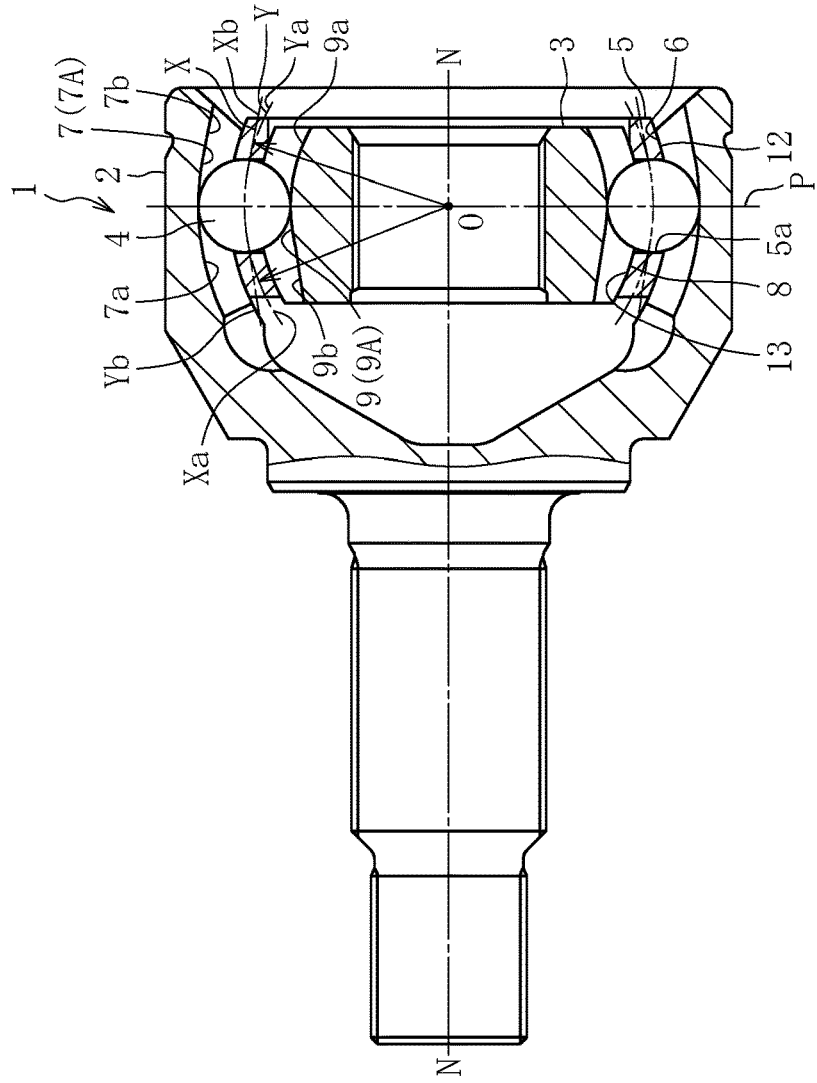

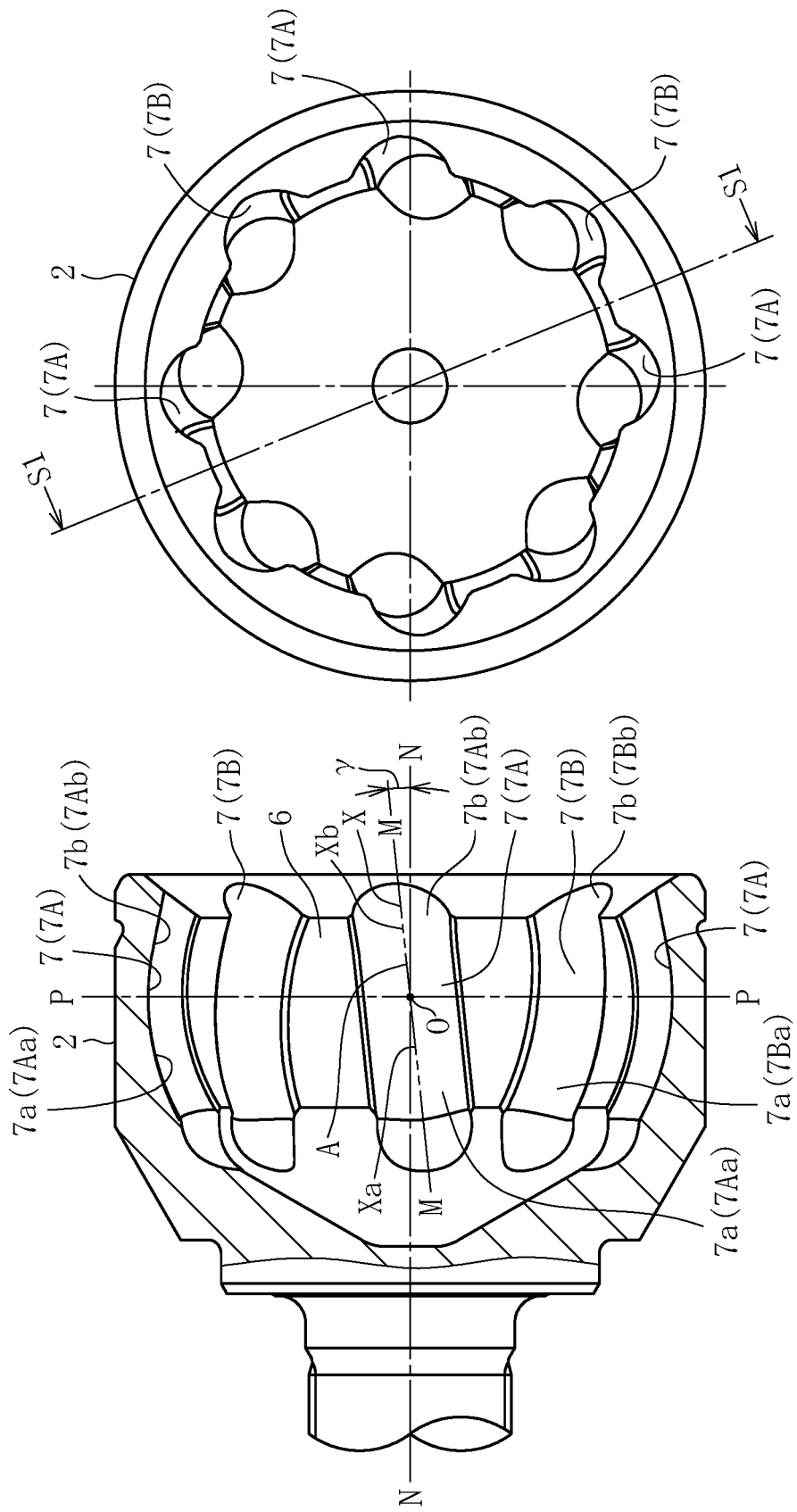

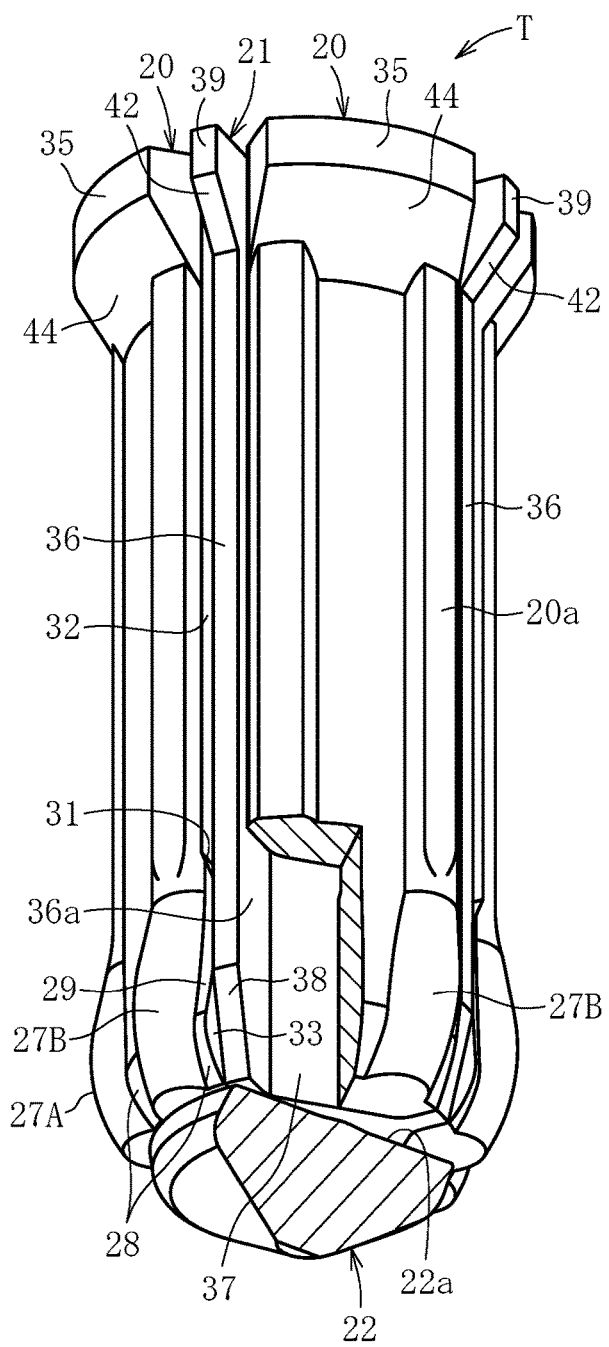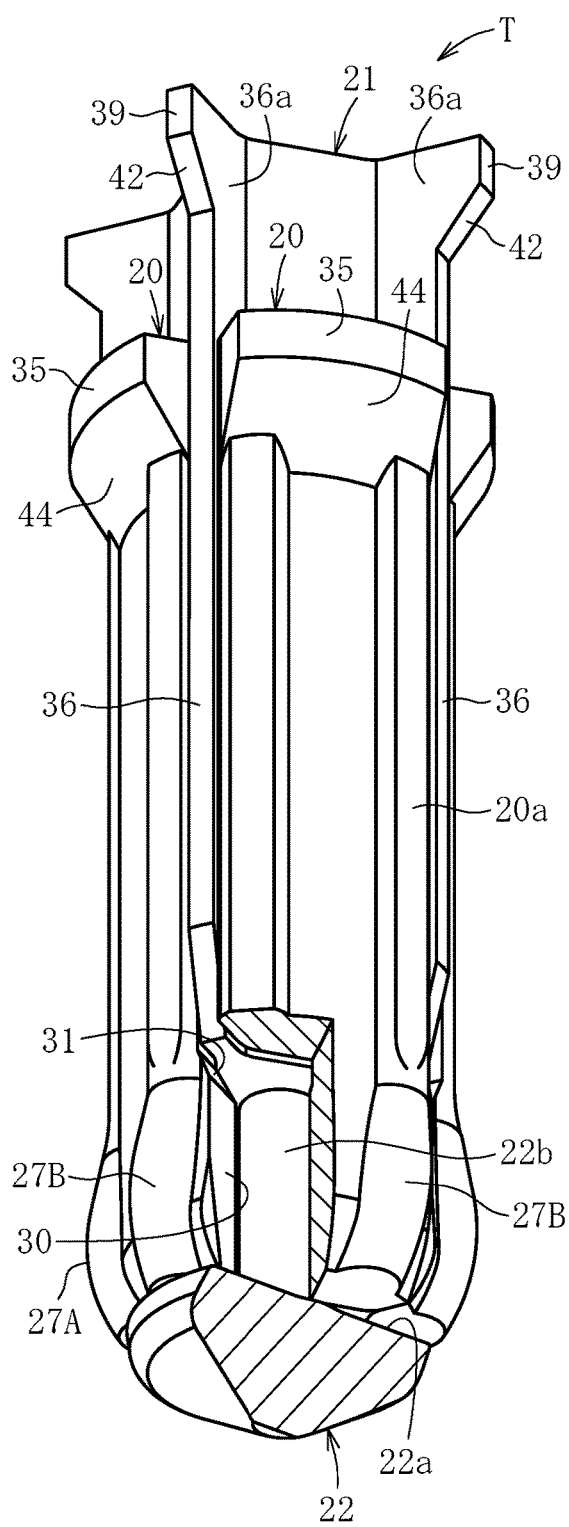

METHOD OF FORGING OUTER JOINT MEMBER OF CONSTANT VELOCITY UNIVERSAL JOINT

TECHNICAL FIELD

The present invention relates to a method of forging an outer joint member of a constant velocity universal joint having the following structure. Specifically, in the constant velocity universal joint, track grooves of the outer joint member and track grooves of an inner joint member each have an arc-shaped ball raceway center line having a curvature center that is not offset in an axial direction with respect to a joint center. A plane including the ball raceway center line and the joint center is inclined in a circumferential direction with respect to a joint axial line. Each of the track grooves of the outer joint member and each of the track grooves of the inner joint member are inclined in mutually opposite directions.

Further, in a case of a constant velocity universal joint in which the track grooves of the outer joint member and the track grooves of the inner joint member are inclined in opposite directions alternately in the circumferential direction, torque loss and heat generation are small, and hence higher efficiency can be attained.

As one of related-art forming methods (referred to as a forming method 1), in Patent Document 1, a method of forging an outer joint member of a Rzeppa constant velocity universal joint is described. As illustrated in FIG. 25, an outer joint member 102 of the constant velocity universal joint has a structure in which track grooves 103 each have an arc shape that is not inclined in a circumferential direction, and a diameter of a track groove bottom 103b at the joint center is larger than a diameter of a track groove bottom 103a of the outer joint member 102 on an opening side. When the outer joint member 102 of the constant velocity universal joint having this structure is to be formed, cold ironing is generally employed.

As illustrated in FIG. 26, a tool for the cold ironing mainly includes punches 120, a punch base 121, an umbrella punch 122, and a die 123. The punches 120 are capable of advancing and retreating in a direction inclined with respect to an axial direction. The punch base 121 is configured to guide the punches 120. The umbrella punch 122 is configured to retain each of the punches 120 at an axial position of the joint center. The die 123 is configured to press a pre-processing material W. Before the cold ironing, the pre-processing material W is formed by sub-hot forging, and is subjected to surface lubrication treatment (for example, bonderizing treatment). The pre-processing material W is placed on the punches 120, and the die 123 presses an outer peripheral surface of the pre-processing material W. In this manner, the ironing is performed. After the ironing, the forged product is held by the die 123 due to springback. Along with raising of the die 123, the forged product is raised while drawing the punches 120. As illustrated in FIG. 27b, the punches 120 are radially contracted by being guided by the punch base 121 that is inclined with respect to the axial direction, thereby attaining mold releasing of the forged product and the punches 120.

As another forming method (forming method 2), in Patent Document 2, there is described a method of forging an outer joint member of a cross-groove constant velocity universal joint, which has cross grooves formed in a cylindrical inner peripheral surface. As illustrated in FIG. 28, the forging die mainly includes stepped punches 140, a punch base 141, an umbrella punch 142 (see FIG. 29a and FIG. 29b), and a die (not shown). The stepped punches 140 are capable of advancing and retreating in parallel to the axial direction. The punch base 141 is configured to guide the punches 140. The umbrella punch 142 is configured to retain each of the punches 140 at the same position in the axial direction. The die is configured to press a pre-processing material. Similarly to the forming method 1, the pre-processing material is formed by sub-hot forging, and is subjected to surface lubrication treatment (for example, bonderizing treatment). In a state in which the pre-processing material is fitted to the forging die, the pre-processing material is press-fitted to the die (not shown) from an opening side of the pre-processing material. In this manner, ironing is performed. After completion of the formation, the forged product is held by the die due to springback. Along with raising of the die, the forged product is raised while drawing the punches 140. As illustrated in FIG. 29b, stepped portions 140a of the punches 140 pass over a distal end portion 141a of the punch base 141 to form a gap between the stepped portions 140a and the punch base 141 so that a radial contraction space for the punches 140 is secured. With this, mold releasing of the forged product and the punches 140 is attained.

PRIOR ART DOCUMENTS

Patent Documents

Patent Document 1: JP2002-346688A
Patent Document 2: JP09-150233A

SUMMARY OF THE INVENTION

Problems to be Solved by the Invention

However, it has been found that, in a case of forming an outer joint member of a constant velocity universal joint of a track groove crossing type, which has track grooves having an arc shape and being inclined in a circumferential direction, in the forming method 1 and the forming method 2 in Patent Documents described above, formation is difficult due to the structural characteristics of the die tool and the functional characteristics of the die tool.

Findings in terms of the structure of the die, which are obtained in the course of achieving the present invention, are described with reference to FIG. 21. In the outer joint member of the constant velocity universal joint of a track groove crossing type, which has the track grooves having an arc shape, the distribution of the track groove cross section in transverse section at an axial position other than the joint center becomes nonuniform. Therefore, as illustrated in FIG. 21, at a distal end of a forming punch in the forming method 1 and the forming method 2, parts A1 in which the track grooves are close to each other and parts A2 in which the track grooves are far from each other are inevitably formed. In the part A1 in which the track grooves are close to each other, a shoulder portion of a punch 160 is narrow, and the thickness of a punch base 161 is also small. In the track groove crossing type, at the time of formation, an unbalanced load is applied to right and left parts of the track groove. Due to the unbalanced load, the forming punch 160 is irregularly deformed, and the formation accuracy is degraded. Further, prediction of the deformation is difficult, and hence feedback to mold design is also difficult. Further, it has been found that the die rigidity of the shoulder portion of the punch 160, which is narrowed, and the die rigidity of the punch base 161, which is reduced in thickness, are reduced, with the result that the life of the die is shortened.

Further, in terms of the function of the die, in the case of the cold ironing in the forming method 1, the amount of radial contraction of the punches is determined by a step until the adjacent punch interferes and by an inclination angle. At distal ends of the punches for the outer joint member of the constant velocity universal joint of a track groove crossing type with the track grooves having an arc shape, the thickness of the punch base is small, and hence the shoulder portions of the punches are liable to interfere with each other. Therefore, a track length that can be formed is shortened. It has been found that, when the number of track grooves is increased from six to eight or ten, the punch base is further thinned, and the amount of radial contraction is reduced, with the result that the track length that can be formed is also shortened.

In the case of the ironing involving pushing from the opening portion side of the pre-processing material into a die hole in the forming method 2, the amount of radial contraction of the punches is determined by a distance to a position at which the adjacent punches interferes. At the distal end surfaces of the punches, the shoulder portions of the punches are liable to interfere with each other because a portion of the punch base corresponding to the part at which the track grooves are close to each other is thin. Therefore, the track length that can be formed is also shortened. Also in a case in which the number of track grooves is increased, the thin punch base is further thinned. As described above, it has been found that, due to the reduction of the amount of radial contraction, the track length that can be formed is also shortened.

Therefore, it has been found that the forming method 1 and the forming method 2 are not suitable for formation of an outer joint member of a constant velocity universal joint of a track groove crossing type with track grooves having an arc shape, which requires formation of a high operating angle, and, in particular, are not suitable for formation of an outer joint member of a constant velocity universal joint of a track groove crossing type with a large number of track grooves having an arc shape.

In view of the above-mentioned problems, the present invention has an object to provide a method of forging an outer joint member of a constant velocity universal joint, which comprises track grooves having an arc shape and being inclined in a circumferential direction. The forging method is capable of forming the track grooves with high accuracy while reducing the cost of a forging die and prolonging the life of the forging die.

Solution to the Problems

As a result of various studies conducted to achieve the above-mentioned object, the inventor of the present invention has conceived a novel idea of forming convex-shaped forming surfaces of a pair of adjacent track grooves on one punch.

As a technical measure for achieving the above-mentioned object, according to one embodiment of the present invention, provided is a method of forging an outer joint member of a constant velocity universal joint. The constant velocity universal joint comprises: an outer joint member having a spherical inner peripheral surface in which a plurality of track grooves are formed; an inner joint member having a spherical outer peripheral surface in which a plurality of track grooves are formed so as to be paired with the track grooves of the outer joint member; a plurality of balls, which are interposed between the track grooves of the outer joint member and the track grooves of the inner joint member, and are configured to transmit torque; and a cage, which is interposed between the spherical inner peripheral surface of the outer joint member and the spherical outer peripheral surface of the inner joint member, and is configured to hold the balls. The track grooves of the outer joint member and the track grooves of the inner joint member each have an arc-shaped ball raceway center line having a curvature center that is prevented from being offset in an axial direction with respect to a joint center. A plane including the ball raceway center line and the joint center is inclined in a circumferential direction with respect to a joint axial line. Each of the track grooves of the outer joint member and each of the track grooves of the inner joint member, which are paired with each other, are inclined in mutually opposite directions. The method comprises performing ironing by press-fitting a cylindrical portion, which is formed on one end of a shaft portion of a pre-processing material of the outer joint member comprising the shaft portion and the cylindrical portion, into a hole of a die in a state in which a punch set that is radially expandable and contractable is fitted to an inner peripheral surface of the cylindrical portion. The punch set comprises: at least a plurality of punches; and a punch base configured to guide the punches so as to enable advancing and retreating. Each of the punches has a pair of forming surfaces for forming the adjacent track grooves.

With the above-mentioned configuration, it is possible to attain the method of forging the outer joint member of the constant velocity universal joint, which comprises the track grooves having an arc shape and being inclined in the circumferential direction. The forging method is capable of forming the track grooves with high accuracy while reducing the cost of the forging die and prolonging the life of the forging die. Specifically, a gap between punches for the pair of adjacent track groove forming surfaces is eliminated, and the pair of track groove forming surfaces are integrally formed on one punch. Thus, with the increase in structural strength and rigidity, formation with high accuracy can be attained. Further, the region having a small thickness of a shoulder portion of the punch is eliminated. Thus, stress concentration is alleviated, thereby being capable of prolonging the life of the die.

It is preferred that, in the above-mentioned ironing, the cylindrical portion be press-fitted into the hole of the die from an opening portion side of the cylindrical portion of the pre-processing material. With this, the material sufficiency at an inner peripheral portion of the pre-processing material can be enhanced. With the structure in which the above-mentioned pair of track groove forming surfaces are integrally formed on one punch and the ironing involving pushing from the opening portion side of the cylindrical portion of the pre-processing material, formation with high accuracy, prolongment in life of the die, and the like can be further promoted.

The above-mentioned punch set comprises an umbrella punch in addition to the punches and the punch base. With this, the respective punches are arrayed with high accuracy, and are retained at the axial positions of the joint center.

The above-mentioned punches and punch base are received and guided into a punch holder, and a length of an advancing stroke of the punches is larger than a length of an advancing stroke of the punch base. With this, a radially contracting operation of the punches can be performed with a simple mechanism.

The inner peripheral surface of the cylindrical portion of the above-mentioned pre-processing material has: an arc-shaped track groove surface having a substantially finished shape and being formed in a substantially half part in an axial direction on a far side so as to be inclined in the circumferential direction; and a linear track groove surface having a preliminary shape and being formed in a substantially half part in the axial direction on an opening side so as to be prevented from being inclined in the circumferential direction. With this, in the sub-hot forging for the pre-processing material, through use of the integral punch, increase in forging cost can be suppressed, and the accuracy of the track grooves can be enhanced.

An outer peripheral surface of the cylindrical portion of the above-mentioned pre-processing material has a protruding portion that is partially projected. With this, a material can be sufficient at the time of formation of inclining the adjacent track grooves in opposite directions in the circumferential direction.

Effects of the Invention

According to one embodiment of the present invention, it is possible to attain the method of forging the outer joint member of the constant velocity universal joint, which comprises the track grooves having an arc shape and being inclined in the circumferential direction. The forging method is capable of forming the track grooves with high accuracy while reducing the cost of the forging die and prolonging the life of the forging die. Specifically, a gap between punches for the pair of adjacent track groove forming surfaces is eliminated, and the pair of track groove forming surfaces are integrally formed on one punch. Thus, with the increase in structural strength and rigidity, formation with high accuracy can be attained. Further, the region having a small thickness of a shoulder portion of the punch is eliminated. Thus, stress concentration is alleviated, thereby being capable of prolonging the life of the die.

BRIEF DESCRIPTION OF DRAWINGS

FIG. 1a is a partial longitudinal sectional view of a constant velocity universal joint in which an outer joint member manufactured based on a forging method according to one embodiment of the present invention is incorporated.

FIG. 1b is a side view of the constant velocity universal joint of FIG. 1a.

FIG. 2a is a partial longitudinal sectional view of the outer joint member of the constant velocity universal joint of FIG. 1a.

FIG. 2b is a side view of the outer joint member of FIG. 2a.

FIG. 3b is a view for illustrating an outer peripheral surface of the inner joint member of the constant velocity universal joint of FIG. 1a.

FIG. 15a is an illustration of a state in which the punches are combined with the punch base, and is a perspective view for illustrating a state in which the punches are radially expanded.

FIG. 15b is an illustration of the state in which the punches are combined with the punch base, and is a perspective view for illustrating a state in which the punches are radially contracted.

FIG. 23 is a partial longitudinal sectional view of the outer joint member of FIG. 22a.

FIG. 24 is a view for illustrating an outer peripheral surface of an inner joint member of FIG. 22a.

EMBODIMENTS OF THE INVENTION

Figure 3C:
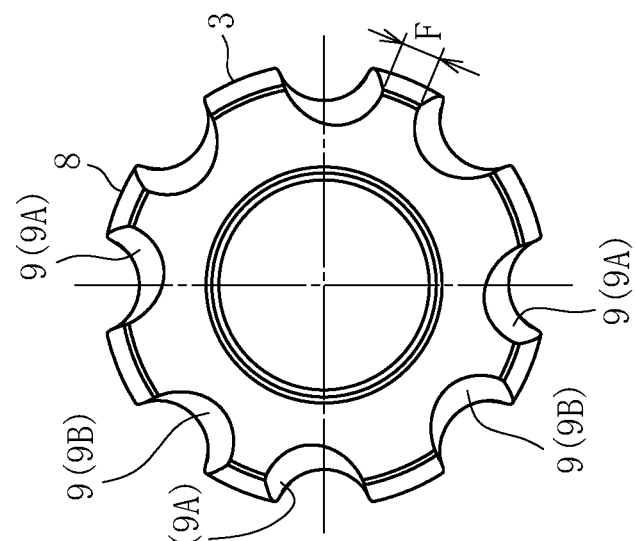
FIG. 3c is a right side view of FIG. 3b.

One example of a constant velocity universal joint in which an outer joint member manufactured based on a forging method according to an embodiment of the present invention is incorporated, and components of the constant velocity universal joint are illustrated in FIG. 1 to FIG. 6. The outer joint member is. The method of forging an outer joint member according to the embodiment of the present invention is illustrated in FIG. 7 to FIG. 19. First, the one example of the constant velocity universal joint and the components of the constant velocity universal joint are described with reference to FIG. 1 to FIG. 6.

FIG. 1a is a partial longitudinal sectional view of the constant velocity universal joint, and FIG. 1b is a right side view of FIG. 1a. A constant velocity universal joint 1 is a fixed type constant velocity universal joint, and mainly comprises an outer joint member 2, an inner joint member 3, balls 4 configured to transmit torque, and a cage 5. As illustrated in FIG. 1b and FIG. 2a to FIG. 3c, eight track grooves 7 of the outer joint member 2 comprise track grooves 7A and 7B that are inclined in a circumferential direction with respect to a joint axial line N-N so that the track grooves 7A and 7B adjacent to each other in the circumferential direction are inclined in directions opposite to each other. Further, eight track grooves 9 of the inner joint member 3 comprise track grooves 9A and 9B that are inclined in the circumferential direction with respect to the joint axial line N-N so that the track grooves 9A and 9B adjacent to each other in the circumferential direction are inclined in directions opposite to each other. Further, a pair of the track grooves 7A and 9A and a pair of the track grooves 7B and 9B of the outer joint member 2 and the inner joint member 3 are inclined in directions opposite to each other (mutually opposite), and the eight balls 4 are arranged in crossing portions of the paired track grooves 7A and 9A and the paired track grooves 7B and 9B of the outer joint member 2 and the inner joint member 3. Detailed description of the track grooves 7 and 9 is given later.

A longitudinal section of the joint is illustrated in FIG. 1a. The term "ball raceway center line" is used herein to accurately describe the form and shape of each track groove extending in the axial direction, such as an inclined state and a curved state of the track groove. The ball raceway center line herein refers to a trajectory of the center of the ball arranged in the track groove at the time of moving along the track groove. Thus, the inclined state of the track groove corresponds to an inclined state of the ball raceway center line, and the arc or linear shape of the track groove corresponds to an arc or linear shape of the ball raceway center line.

As illustrated in FIG. 1a, each track groove 7 of the outer joint member 2 has a ball raceway center line X. The track groove 7 comprises a first track groove portion 7a having an arc-shaped ball raceway center line Xa about a joint center O defined as a curvature center, and a second track groove portion 7b having a linear ball raceway center line Xb. The ball raceway center line Xb of the second track groove portion 7b is smoothly continuous with the ball raceway center line Xa of the first track groove portion 7a as a tangential line. Meanwhile, each track groove 9 of the inner joint member 3 has a ball raceway center line Y. The track groove 9 comprises a first track groove portion 9a having an arc-shaped ball raceway center line Ya about the joint center O defined as a curvature center, and a second track groove portion 9b having a linear ball raceway center line Yb. The ball raceway center line Yb of the second track groove portion 9b is smoothly continuous with the ball raceway center line Ya of the first track groove portion 9a as a tangential line.

The curvature centers of the ball raceway center lines Xa and Ya of the first track groove portions 7a and 9a are arranged on the joint center O, that is, on the joint axial line N-N. As a result, the track groove depths can be set equal to each other and the processing can be facilitated. The track grooves 7 and 9 each have an elliptical shape or a Gothic arch shape in transverse section, and the track grooves 7 and 9 are held in so-called angular contact with each ball 4 at a contact angle (approximately from 30° to 45°). Thus, the ball 4 is held in contact with side surface sides of the track grooves 7 and 9, which are slightly spaced apart from groove bottoms of the track grooves 7 and 9.

With reference to FIG. 2, detailed description is given of a state in which the track grooves 7 of the outer joint member 2 are inclined in the circumferential direction with respect to the joint axial line N-N. FIG. 2a is a partial longitudinal sectional view of the outer joint member 2, and FIG. 2b is a right side view of the outer joint member 2. The track grooves 7 of the outer joint member 2 are denoted by the reference symbols 7A and 7B to indicate a difference in inclination direction thereof. As illustrated in FIG. 2a, a plane M including the ball raceway center line X of each track groove 7A and the joint center O is inclined at an angle Y in the circumferential direction with respect to the joint axial line N-N. In addition, in the case of each track groove 7B adjacent to the track groove 7A in the circumferential direction, although illustration is omitted, a plane M including the ball raceway center line X of the track groove 7B and the joint center O is inclined at an angle Y with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and may be carried out in such a mode that only the ball raceway center line Xa of the first track groove portion 7a is included in the plane M. Therefore, it is only required that the plane M including at least the ball raceway center line Xa of the first track groove portion 7a and the joint center O be inclined in the circumferential direction with respect to the joint axial line N-N and the first track groove portions 7a adjacent to each other in the circumferential direction be inclined in directions opposite to each other.

Now, supplementary description is given of the reference symbols of the track grooves. The track grooves of the outer joint member 2 as a whole are denoted by the reference symbol 7. The first track groove portion is denoted by the reference symbol 7a. The second track groove portion is denoted by the reference symbol 7b. Further, the track grooves distinguished from each other based on the difference in inclination direction are denoted by reference symbols 7A and 7B. First track groove portions of the respective track grooves 7A and 7B are denoted by reference symbols 7Aa and 7Ba. Second track groove portions of the respective track grooves 7A and 7B are denoted by reference symbols 7Ab and 7Bb. The track grooves of the inner joint member 3 described later are denoted by reference symbols in a similar manner.

Figure 3B:
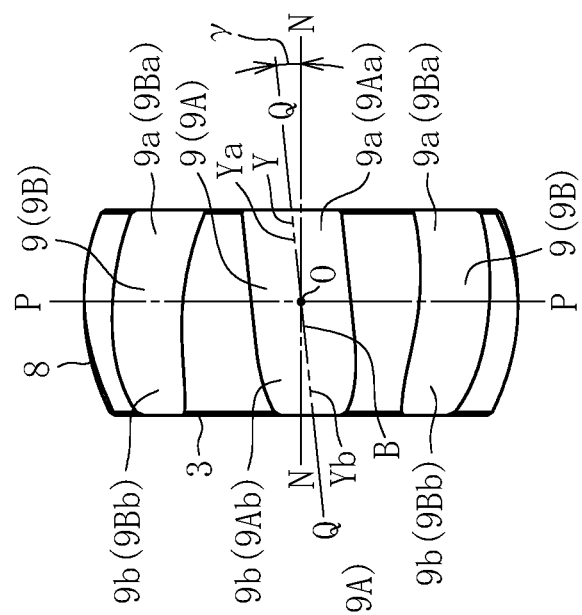
Figure 3A:
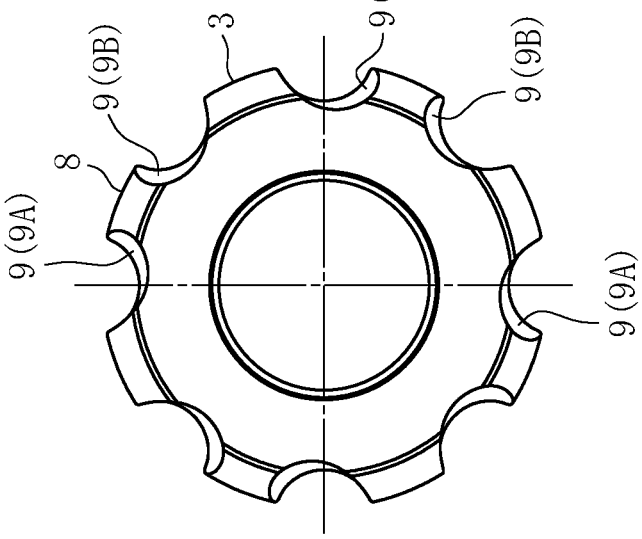
FIG. 3a is an illustration of an inner joint member of the constant velocity universal joint of FIG. 1a, and is a left side view of FIG. 3b.

Next, with reference to FIG. 3, detailed description is given of a state in which the track grooves 9 of the inner joint member 3 are inclined in the circumferential direction with respect to the joint axial line N-N. FIG. 3b is a view of the outer peripheral surface of the inner joint member 3. FIG. 3a is a left side view of the inner joint member 3. FIG. 3c is a right side view of the inner joint member 3. The track grooves 9 of the inner joint member 3 are denoted by the reference symbols 9A and 9B to indicate a difference in inclination direction thereof. As illustrated in FIG. 3b, a plane Q including the ball raceway center line Y of each track groove 9A and the joint center O is inclined at an angle Y in the circumferential direction with respect to the joint axial line N-N. In addition, in the case of each track groove 9B adjacent to the track groove 9A in the circumferential direction, although illustration is omitted, a plane Q including the ball raceway center line Y of the track groove 9B and the joint center O is inclined at an angle Y with respect to the joint axial line N-N in an opposite direction to the inclination direction of the track groove 9A. It is preferred that the inclination angle Y be set to an angle of from 4° to 12° in consideration of operability of the constant velocity universal joint 1 and a spherical width F between the closest sides of the track grooves of the inner joint member 3. Further, similarly to the outer joint member described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such a mode that only the ball raceway center line Ya of the first track groove portion 9a is included in the plane Q. Thus, it is only required that the plane Q including at least the ball raceway center line Ya of the first track groove portion 9a and the joint center O be inclined in the circumferential direction with respect to the joint axial line N-N and the first track groove portions 9a adjacent to each other in the circumferential direction be inclined in directions opposite to each other. The ball raceway center line Y of the track groove 9 of the inner joint member 3 is formed so as to be mirror-image symmetrical with the ball raceway center line X of the paired track groove 7 of the outer joint member 2 with respect to a plane P that includes the joint center O at an operating angle of 0° and is perpendicular to the joint axial line N-N.

Figure 4:
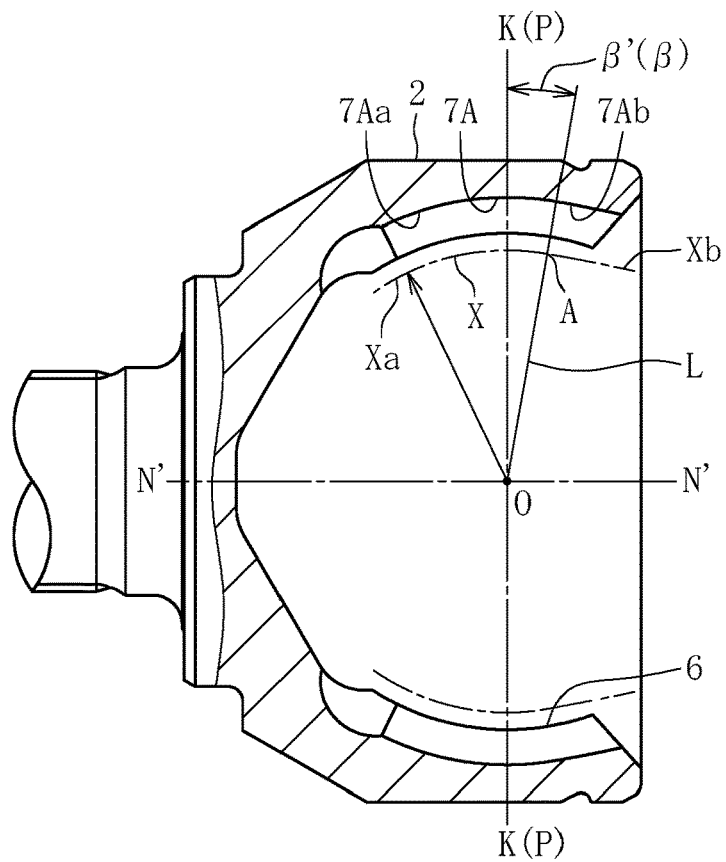
FIG. 4 is a partial longitudinal sectional view for illustrating the details of track grooves of the outer joint member.

With reference to FIG. 4, detailed description is given of the track grooves as viewed in longitudinal section of the outer joint member 2. The partial longitudinal section of FIG. 4 corresponds to a sectional view taken along the above-mentioned plane M of FIG. 2a including the ball raceway center line X of the track groove 7A and the joint center O. Thus, in a strict sense, FIG. 4 is not a longitudinal sectional view taken along the plane including the joint axial line N-N, but is an illustration of a cross section inclined at the angle Y. In FIG. 4, the track groove 7A of the outer joint member 2 is illustrated, and the illustration and description of the track groove 7B are omitted because the inclination direction of the track groove 7B is opposite to that of the track groove 7A and the other configurations of the track groove 7B is the same as those of the track groove 7A. A spherical inner peripheral surface 6 of the outer joint member 2 has the track grooves 7A formed substantially along the axial direction. Each track groove 7A has the ball raceway center line X. The track groove 7A comprises the first track groove portion 7Aa having the arc-shaped ball raceway center line Xa about the joint center O defined as a curvature center (with no offset in the axial direction), and the second track groove portion 7Ab having the linear ball raceway center line Xb. In addition, the linear ball raceway center line Xb of the second track groove portion 7Ab is smoothly connected, as a tangential line, to an end portion A on an opening side of the ball raceway center line Xa of the first track groove portion 7Aa. That is, the end portion A is a connecting point between the first track groove portion 7Aa and the second track groove portion 7Ab. The end portion A is located on the opening side with respect to the joint center O, and hence the linear ball raceway center line Xb of the second track groove portion 7Ab that is connected, as a tangential line, to the end portion A on the opening side of the ball raceway center line Xa of the first track groove portion 7Aa is formed so as to approach the joint axial line N-N (see FIG. 1a) as the distance to the opening side becomes smaller. Thus, it is possible to secure an effective track length at a maximum operating angle, and to suppress excessive increase in wedge angle.

As illustrated in FIG. 4, L represents a straight line connecting the end portion A and the joint center O. A joint axial line N'-N' projected onto the plane M including the ball raceway center line X of the track groove 7A and the joint center O (see FIG. 2a) is inclined at an angle Y with respect to the joint axial line N-N, and an angle formed between a perpendicular line K and the straight line L with respect to the joint center O on the axial line N'-N' is represented by ß'. The above-mentioned perpendicular line K is formed in the plane P including the joint center O at the operating angle of 0°. Thus, an angle ß formed by the straight line L with respect to the plane P including the joint center O at the operating angle of 0° satisfies a relationship of sin ß=sin ß'×cos Y.

Figure 5:
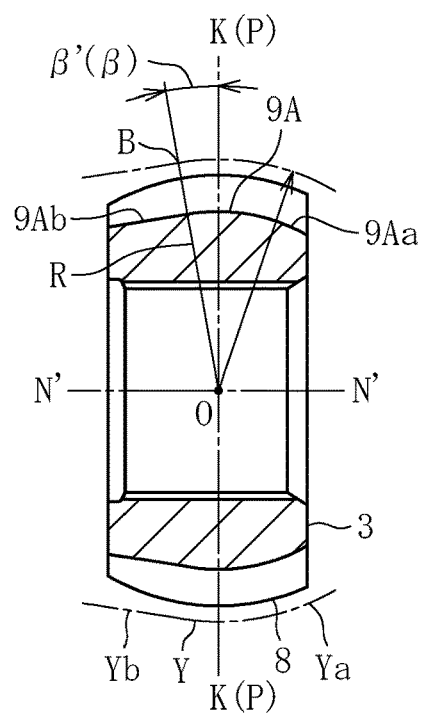
FIG. 5 is a longitudinal sectional view for illustrating the details of track grooves of the inner joint member.

Similarly, with reference to FIG. 5, detailed description is given of the track grooves as viewed in longitudinal section of the inner joint member 3. The partial longitudinal section of FIG. 5 corresponds to a sectional view taken along the above-mentioned plane Q of FIG. 3b including the ball raceway center line Y of the track groove 9A and the joint center O. Thus, similarly to FIG. 4, in a strict sense, FIG. 5 is not a longitudinal sectional view in the plane including the joint axial line N-N, but is an illustration of a cross section inclined at the angle Y. In FIG. 5, the track groove 9A of the inner outer joint member 3 is illustrated, and the illustration and description of the track groove 9B are omitted because the inclination direction of the track groove 9B is opposite to that of the track groove 9A and the other configurations of the track groove 9B is the same as those of the track groove 9A. A spherical outer peripheral surface 8 of the inner joint member 3 has the track grooves 9A formed substantially along the axial direction. Each track groove 9A has the ball raceway center line Y. The track groove 9A comprises the first track groove portion 9Aa having the arc-shaped ball raceway center line Ya about the joint center O defined as a curvature center (with no offset in the axial direction), and the second track groove portion 9Ab having the linear ball raceway center line Yb. In addition, the ball raceway center line Yb of the second track groove portion 9Ab is smoothly connected, as a tangential line, to an end portion B on a far side of the ball raceway center line Ya of the first track groove portion 9Aa. That is, the end portion B is a connecting point between the first track groove portion 9Aa and the second track groove portion 9Ab. The end portion B is located on the far side with respect to the joint center O, and hence the linear ball raceway center line Yb of the second track groove portion 9Ab that is connected, as a tangential line, to the end portion B on the far side of the ball raceway center line Ya of the first track groove portion 9Aa is formed so as to approach the joint axial line N-N (see FIG. 1a) as the distance to the far side becomes smaller. Thus, it is possible to secure an effective track length at a maximum operating angle, and to suppress excessive increase in wedge angle.

As illustrated in FIG. 5, R represents a straight line connecting the end portion B and the joint center O. A joint axial line N'-N' projected onto the plane Q including the ball raceway center line Y of the track groove 9A and the joint center O (see FIG. 3b) is inclined at an angle Y with respect to the joint axial line N-N, and an angle formed between a perpendicular line K and the straight line R with respect to the joint center O on the axial line N'-N' is represented by ß'. The above-mentioned perpendicular line K is formed in the plane P including the joint center O at the operating angle of 0°. Thus, an angle ß formed by the straight line R with respect to the plane P including the joint center O at the operating angle of 0° satisfies a relationship of $\sin ß = \sin ß' \times \cos Y$.

Next, description is given of the angle ß formed by each of the straight lines L and R with respect to the plane P including the joint center O at the operating angle of 0°. At an operating angle θ, each ball 4 moves by θ/2 with respect to the plane P including the joint center O in the outer joint member 2 and the inner joint member 3. The angle ß is determined based on ½ of a frequently used operating angle, and a contact range of the track groove for the ball 4 is determined within a range of the frequently used operating angle. Now, the frequently used operating angle is defined. First, a normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle ß formed by each of the straight lines L and R with respect to the plane P including the joint center O at the operating angle of 0° is set to an angle of 3° to 10°. The angle ß is not limited to the angle of from 3° to 10°, and may be set appropriately in accordance with the design conditions for vehicle types. When the angle ß is set to the angle of from 3° to 10°, the fixed type constant velocity universal joint of this embodiment is widely applicable to various vehicle types.

In FIG. 4, due to the above-mentioned angle ß, the end portion A of the ball raceway center line Xa of the first track groove portion 7Aa corresponds to a center position of the ball that is moved to the end of the opening side along the axial direction at the frequently used operating angle. Similarly, in FIG. 5 in the case of the inner joint member 3, the end portion B of the ball raceway center line Ya of the first track groove portion 9Aa corresponds to a center position of the ball that is moved to the end of the far side along the axial direction at the frequently used operating angle. With this setting, within the range of the frequently used operating angles, the balls 4 are located between the first track groove portions 7Aa and 9Aa of the outer joint member 2 and the inner joint member 3 and between the first track groove portions 7Ba and 9Ba that are inclined in the opposite directions (see FIG. 2a and FIG. 3b). Therefore, forces in opposite directions are applied from the balls 4 to pocket portions 5a of the cage 5 that are adjacent to each other in the circumferential direction, and hence the cage 5 is stabilized at the position of the joint center O (see FIG. 1a). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation, and torque loss and heat generation are suppressed. As a result, the durability is enhanced.

In the constant velocity universal joint 1, the balls 4 may be fitted into the pocket portions 5a of the cage 5 with a gap. In this case, it is preferred that the gap be set with a clearance of approximately from 0 μm to 40 μm. When the balls 4 are fitted into the pocket portions 5a with the gap, the balls 4 held in the pocket portions 5a of the cage 5 can smoothly be operated, and hence the torque loss can further be reduced.

Figure 6:
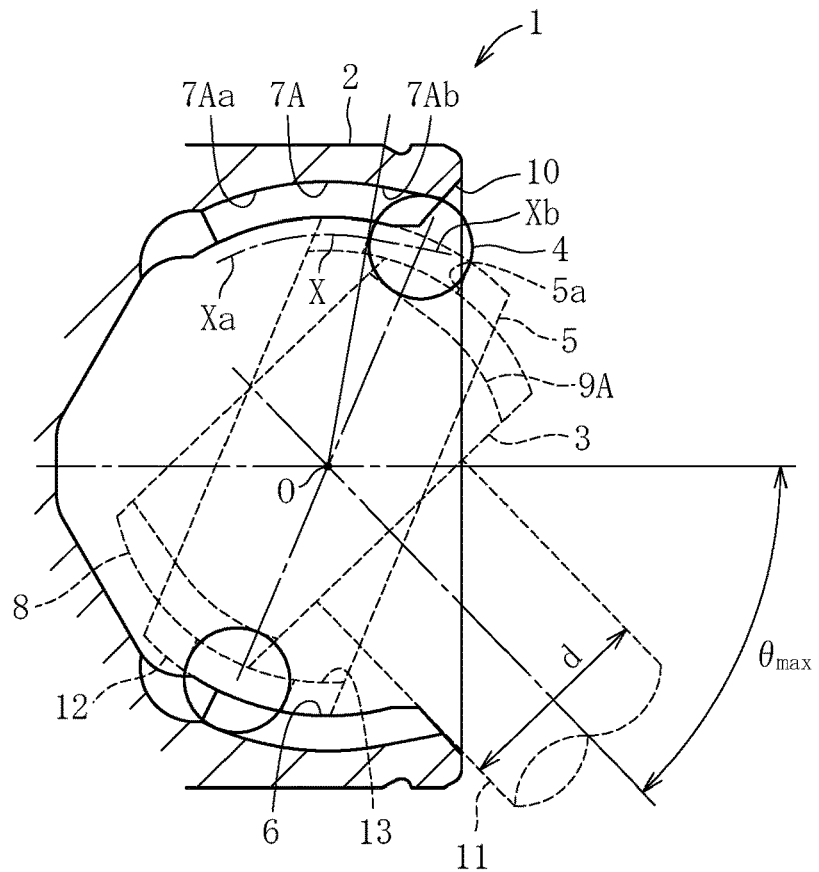
FIG. 6 is a view for illustrating a state in which the constant velocity universal joint of FIG. 1a forms a maximum operating angle.

In FIG. 6, a state in which the constant velocity universal joint 1 forms the maximum operating angle is illustrated. In each track groove 7A of the outer joint member 2, the second track groove portion 7Ab having the linear ball raceway center line Xb is formed on the opening side. With the second track groove portion 7Ab, the effective track length at the maximum operating angle can be secured, and the excessive increase in wedge angle can be suppressed in a compact design. Therefore, even when a maximum operating angle $θ_{max}$ is set as high as approximately 47° as illustrated in FIG. 6, the contact state can be secured between the ball 4 and the track groove portion 7Ab under a state in which an inlet chamfer 10 having a necessary and sufficient size is formed, and the increase in wedge angle can be suppressed.

In a range of high operating angles, the balls 4 arranged in the circumferential direction are temporarily positioned apart between the first track groove portions 7Aa and 9Aa (7Ba and 9Ba; see FIG. 2a and FIG. 3b) and between the second track groove portions 7Ab and 9Ab (7Bb and 9Bb; see FIG. 2a and FIG. 3b). Along with this, the forces applied from the balls 4 to the pocket portions 5a of the cage 5 are not balanced with each other, and hence the contact forces are generated between the spherical contact portions 12 and 6 of the cage 5 and the outer joint member 2 and between the spherical contact portions 13 and 8 of the cage 5 and the inner joint member 3, respectively. However, the angles in the range of high operating angles are used less frequently, and hence the constant velocity universal joint 1 according to this embodiment is comprehensively capable of suppressing the torque loss and heat generation. Thus, it is possible to attain a compact fixed type constant velocity universal joint that is suppressed in torque loss and heat generation, is enhanced in efficiency, is capable of forming high operating angles, and is excellent in strength and durability at the high operating angles.

In the above-mentioned one example of the constant velocity universal joint, the ball raceway center line Xb of the second track groove portion 7b and the ball raceway center line Yb of the second track groove portion 9b each have a linear shape, but the present invention is not limited thereto. The ball raceway center lines of the second track groove portions may each have a recessed arc shape or a protruding arc shape having a relatively large curvature radius. Also in this case, an effective track length at a maximum operating angle can be secured, and excessive increase in wedge angle can be suppressed.

The one example and the components of the constant velocity universal joint, in which the outer joint member manufactured based on the forging method according to the embodiment of the present invention is incorporated, are as described above. Next, the method of forging an outer joint member according to the embodiment of the present invention is described with reference to FIG. 7 to FIG. 19.

Figure 7:
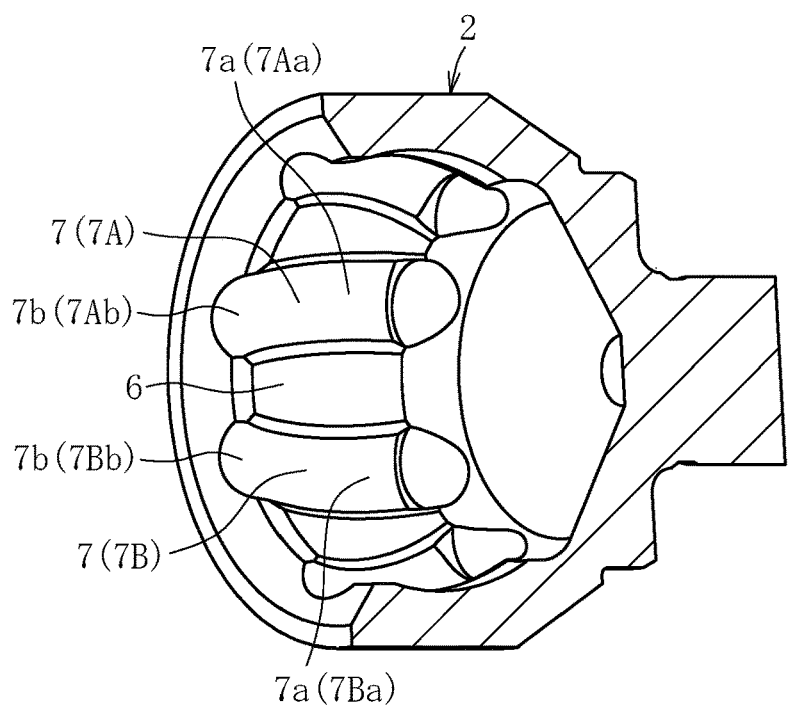
FIG. 7 is a perspective view of the outer joint member as viewed in a direction indicated by the arrows of the line S1-S1 of FIG. 2b.

FIG. 7 is a perspective view of a single finished product of the outer joint member 2 as viewed in a direction indicated by the arrows of the line S1-S1 of FIG. 2b. The details of the outer joint member 2 are as described above. The outer joint member 2 is formed of carbon steel for machine structural use (for example, S53C) or the like, and a hardened layer is formed on a surface of the outer joint member 2 by induction hardening. In the outer joint member 2, the first track groove portions 7a (7Aa and 7Ba) are formed on the far side, and the second track groove portions 7b (7Ab and 7Bb) are formed on the opening side. Both the track groove portions are smoothly continuous with each other. The spherical inner peripheral surface 6 is formed between the track grooves 7 (7A and 7B). Turning, spline processing, heat treatment, grinding, and the like are performed on a forged product after a forming step described later to obtain the finished product illustrated in FIG. 7.

Figure 8:
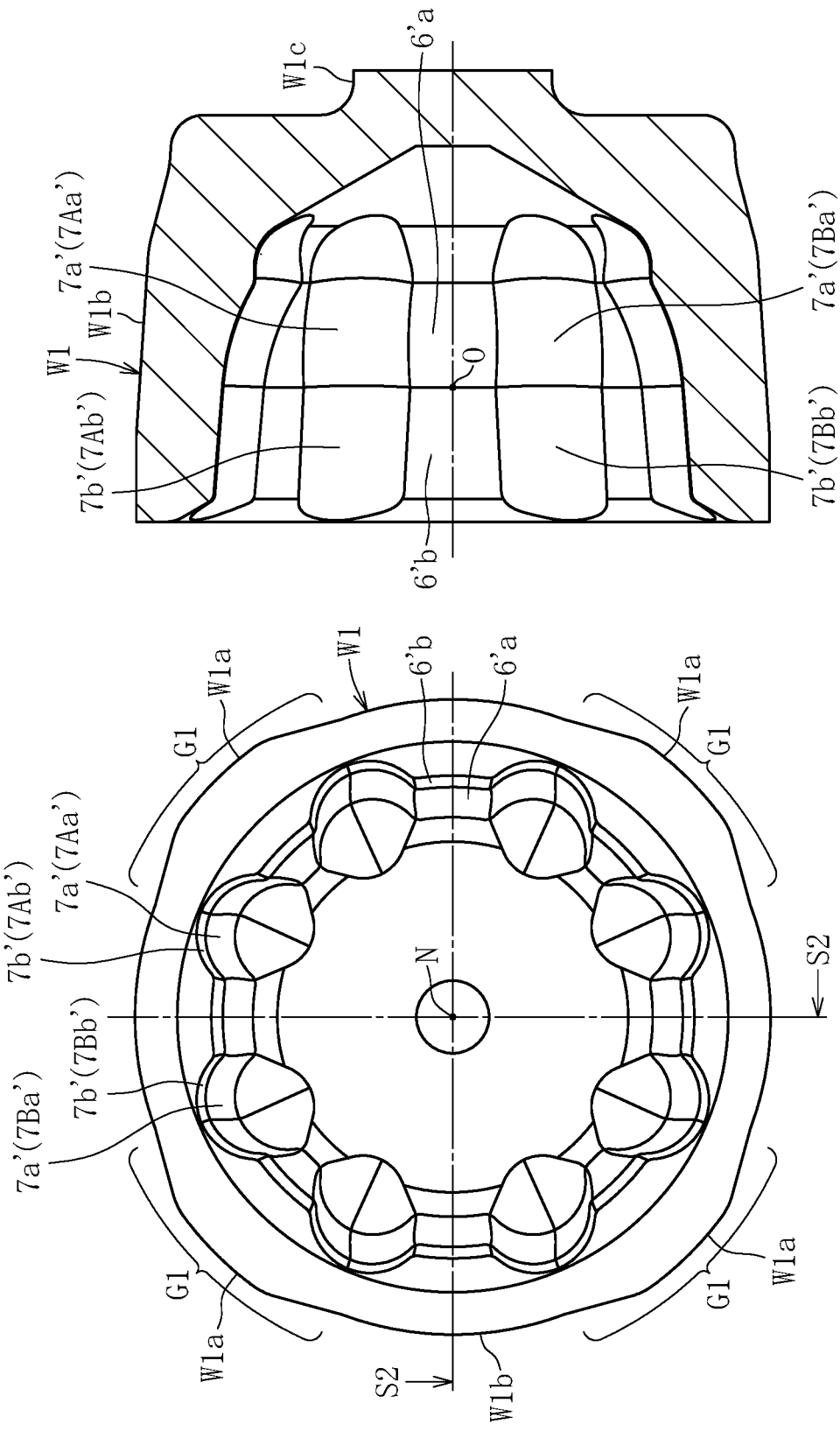
FIG. 8a is a longitudinal sectional view of a pre-processing material of the outer joint member in the forging method according to one embodiment of the present invention.
FIG. 8b is a side view of the pre-processing material of the outer joint member in the forging method according to one embodiment of the present invention.
Figure 9:
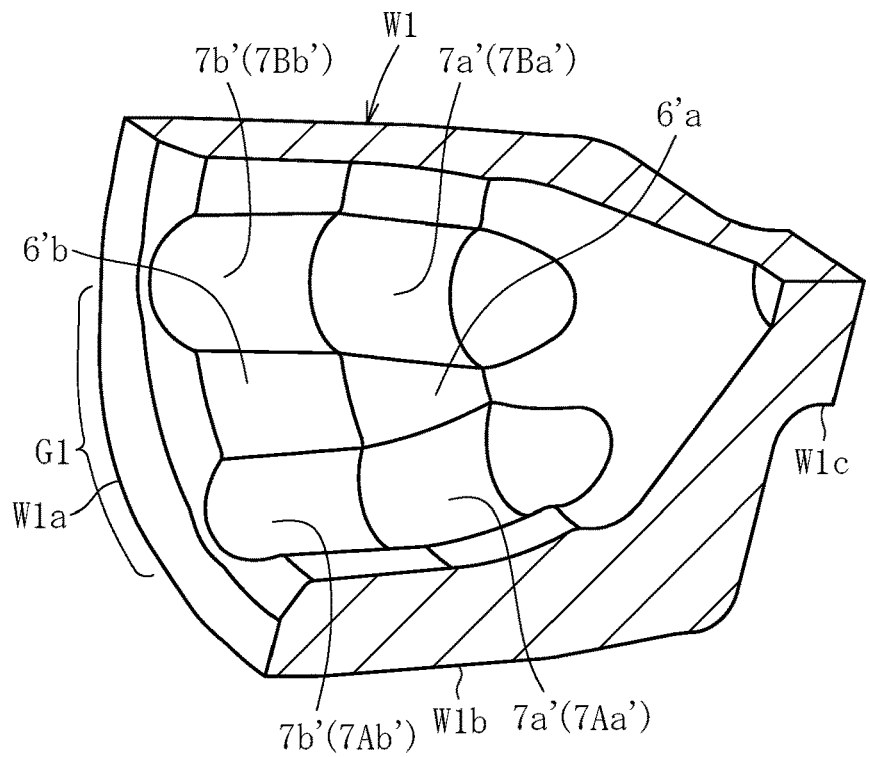
FIG. 9 is a perspective view of the pre-processing material as viewed in a direction indicated by the arrows of the line S2-N-S2 of FIG. 8b.
Figure 10:
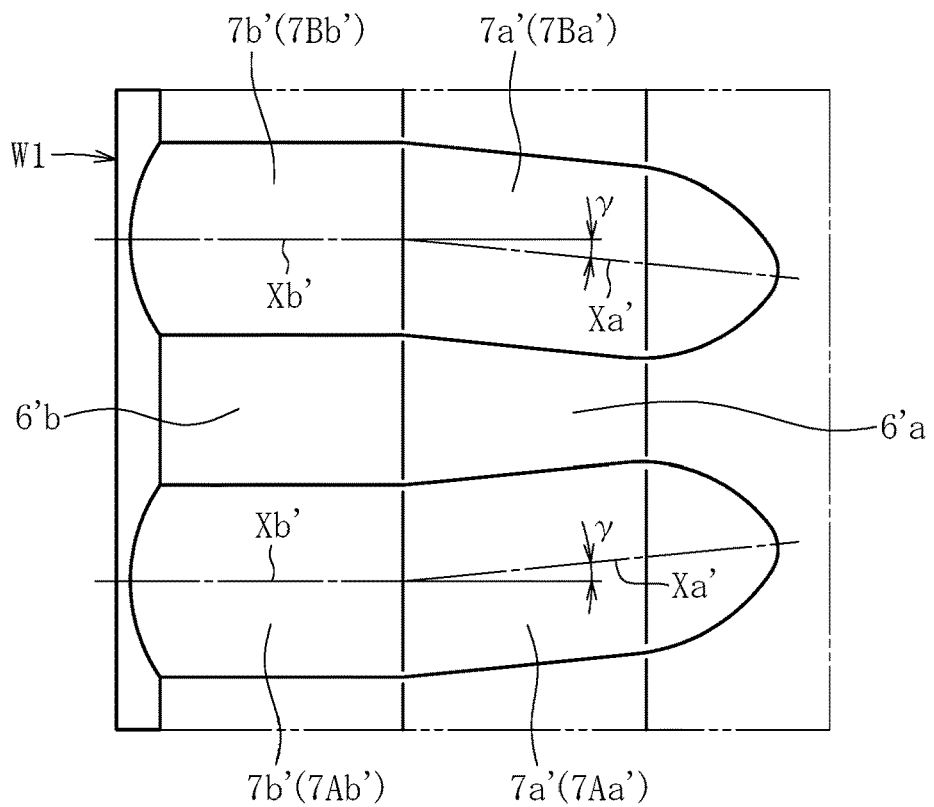
FIG. 10 is a developed view for illustrating an inner peripheral surface of the pre-processing material of FIG. 9.
Figure 11:
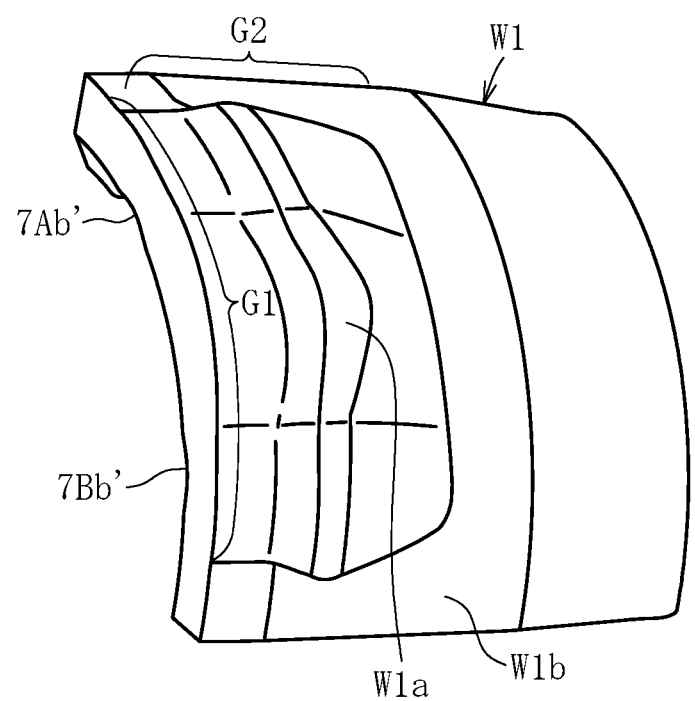
FIG. 11 is a perspective view for illustrating an outer peripheral surface of the pre-processing material of FIG. 9.

This embodiment has a feature in the method of forging the above-mentioned outer joint member 2. A pre-processing material in the forging method according to this embodiment is described with reference to FIG. 8 to FIG. 11. FIG. 8a is a longitudinal sectional view of the pre-processing material. FIG. 8b is a side view of the pre-processing material. FIG. 9 is a perspective view of the pre-processing material as viewed in a direction indicated by the arrows of the line S2-N-S2 of FIG. 8b. FIG. 10 is a developed view of an inner peripheral surface of the pre-processing material of FIG. 9. FIG. 11 is a perspective view of an outer peripheral surface of the pre-processing material of FIG. 9.

The pre-processing material before cold ironing in the forging method according to this embodiment, which is illustrated in FIG. 8a and FIG. 8b, is formed by sub-hot forging, and is subjected to surface lubrication treatment (for example, bonderizing treatment). A pre-processing material W1 comprises a cylindrical portion W1b and a shaft portion W1c, and, on an inner peripheral surface of the cylindrical portion W1b, surfaces 7a' (7Aa' and 7Ba') having a substantially finished shape (hereinafter simply referred to as "first track groove surfaces 7a' (7Aa' and 7Ba') having a substantially finished shape") corresponding to the first track groove portions 7a (7Aa and 7Ba)(see FIG. 7) are formed in a substantially half part on the far side from the joint center O of FIG. 8a. Surfaces 7b' (7Ab' and 7Bb') having a preliminary shape (hereinafter simply referred to as "second track groove surfaces 7b' (7Ab' and 7Bb') having a preliminary shape") corresponding to the remaining part from the first track groove portions 7a (7Aa and 7Ba) and the second track groove portions 7b (7Ab and 7Bb) having a linear shape are formed in a substantially half part on the opening side from the joint center O of FIG. 8a. The first track groove surfaces 7a' (7Aa' and 7Ba') having a substantially finished shape are inclined in the circumferential direction, and each have an arc shape about the joint center O defined as a curvature center. Meanwhile, the second track groove surfaces 7b' (7Ab' and 7Bb') having a preliminary shape each have a linear shape without inclination in the circumferential direction.

The first track groove surfaces 7a' (7Aa' and 7Ba') having a substantially finished shape of the pre-processing material W1 are formed in the substantially half part on the far side from the joint center O. In this configuration, the inclination angle Y of the track groove surfaces is relatively small, and the track groove surfaces on the substantially half part on the far side each have an arc shape about the joint center O defined as the curvature center. Therefore, the pre-processing material W1 can be formed by an integral punch in the sub-hot forging without interference between shoulder portions of the first track groove surfaces 7a' (7Aa' and 7Ba') having a substantially finished shape. With this, increase in forging cost can be suppressed, and the accuracy of the track grooves can be enhanced.

An inner peripheral surface 6'a having a substantially finished shape (hereinafter simply referred to as "spherical inner peripheral surface 6'a having a substantially finished shape") corresponding to the spherical inner peripheral surface 6 (see FIG. 7) is formed in the substantially half part on the far side from the joint center O of FIG. 8a, and an inner peripheral surface 6'b having a preliminary shape with a substantially cylindrical shape (hereinafter simply referred to as "substantially cylindrical inner peripheral surface 6'b having a preliminary shape") is formed in the substantially half part on the opening side from the joint center O of FIG. 8a.

In a perspective view of FIG. 9, the first track groove surfaces 7a' (7Aa' and 7Ba') having a substantially finished shape, the second track groove surfaces 7b' (7Ab' and 7Bb') having a preliminary shape, the spherical inner peripheral surface 6'a having a substantially finished shape, and the substantially cylindrical inner peripheral surface 6'b having a preliminary shape of the pre-processing material W1 are illustrated in a more understandable way. The second track groove surfaces 7b' (7Ab' and 7Bb') having a preliminary shape and the substantially cylindrical inner peripheral surface 6'b having a preliminary shape each have a tapered shape slightly radially expanded toward the opening side as a draft of a die.

Further, in a developed view of FIG. 10, inclined states in the circumferential direction of the first track groove surfaces 7a' (7Aa' and 7Ba') having a substantially finished shape and the second track groove surfaces 7b' (7Ab' and 7Bb') having a preliminary shape are illustrated in a more understandable way. Ball raceway center lines Xa' of the first track groove surfaces 7a' (7Aa' and 7Ba') having a substantially finished shape are each inclined at an angle Y in the circumferential direction with respect to the joint axial line N-N (see FIG. 2a). Meanwhile, ball raceway center lines Xb' of the second track groove surfaces 7b' (7Ab' and 7Bb') having a preliminary shape each have a linear shape without inclination in the circumferential direction.

As illustrated in FIG. 11, on the outer peripheral surface of the pre-processing material W1, protruding portions W1a having a thickness increased by partially increasing an outer diameter are formed at four positions in the circumferential direction. The protruding portions W1a are formed so as to secure a sufficient amount of a material at the time of formation of inclining the second track groove surfaces 7Ab' and 7Bb' having a preliminary shape of FIG. 9 in opposite directions in the circumferential direction. In other words, the protruding portions W1a are formed so as to secure the sufficient amount of the material at the time of formation of increasing intervals between the second track groove surfaces 7Ab' and 7Bb' having a preliminary shape in the circumferential direction on the opening side. Therefore, the protruding portions W1a are partially formed in ranges of G1 and G2 illustrated in FIG. 8b, FIG. 9, and FIG. 11. The specific shapes of the protruding portions W1a are set in consideration of a state of sufficiency of the material.

Figure 12A:
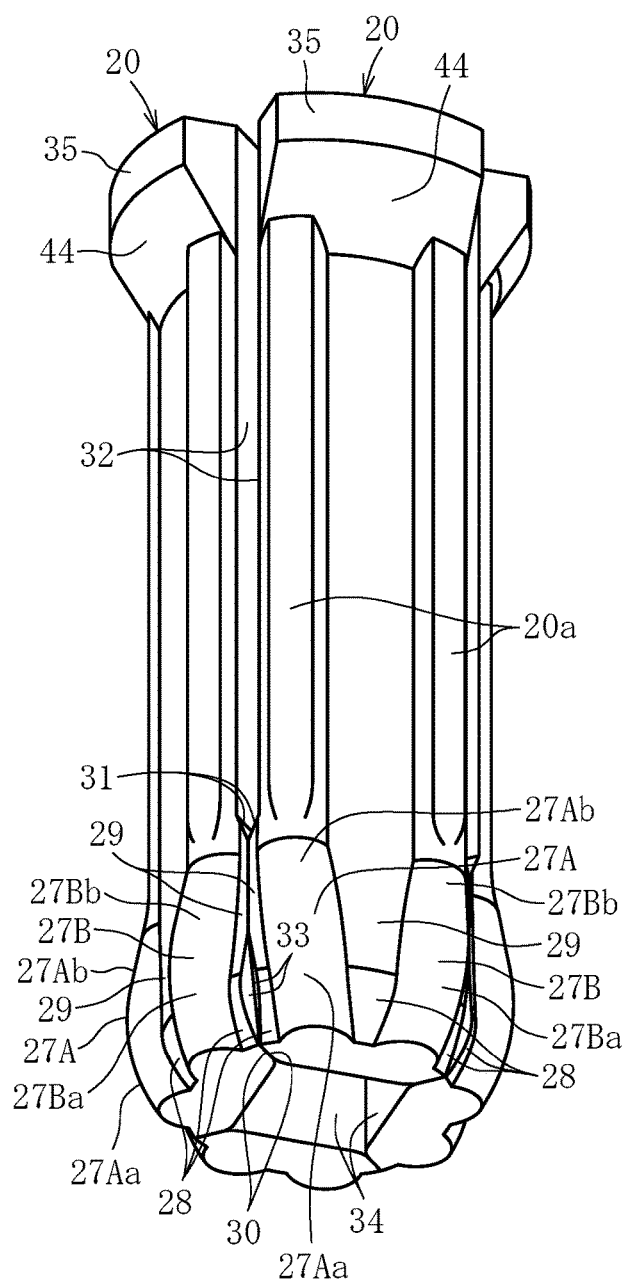
FIG. 12a is a perspective view of punches as a forging die.
Figure 12B:
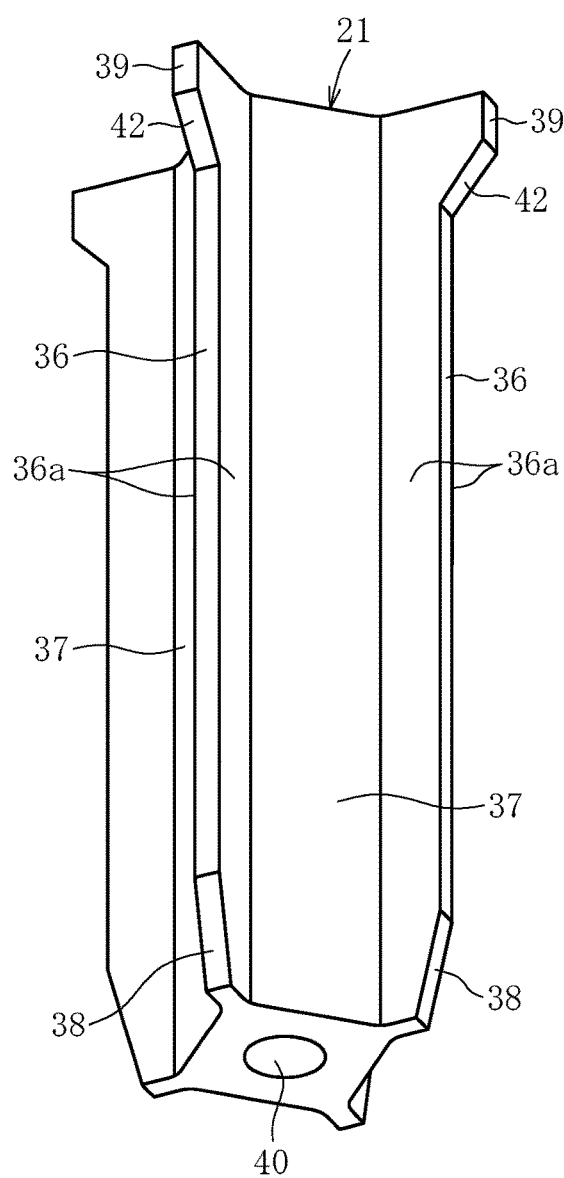
FIG. 12b is a perspective view of a punch base as the forging die.
Figure 13B:
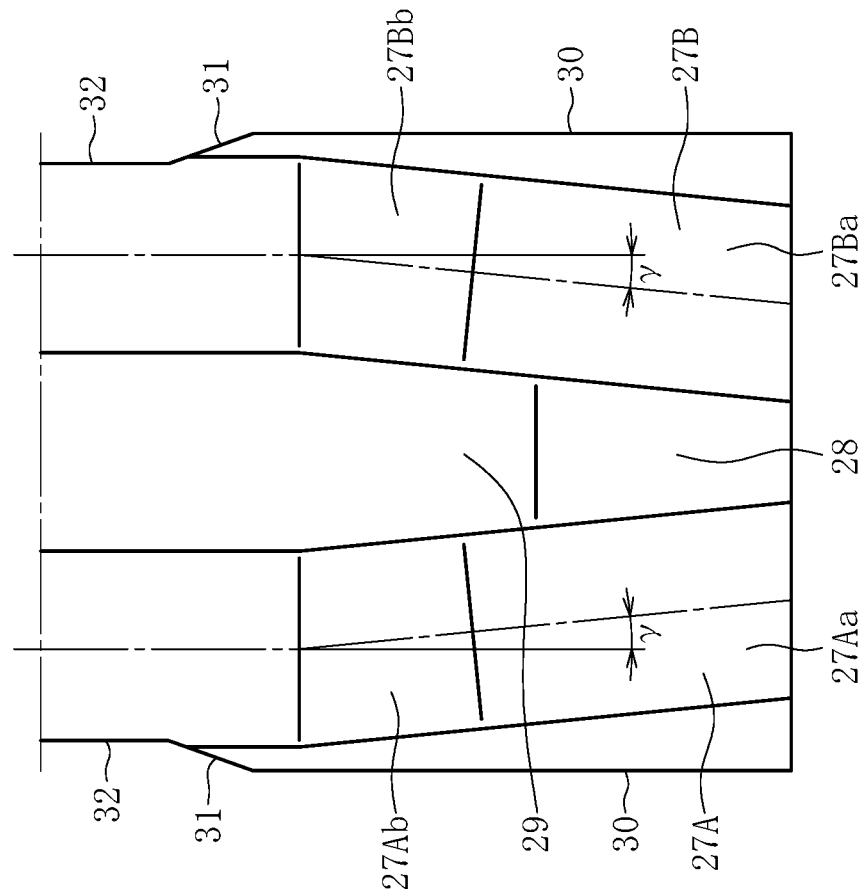
FIG. 13b is an illustration of the forming part at the distal end of the forging die of FIG. 12a, and is a developed view of the punch.
Figure 13A:
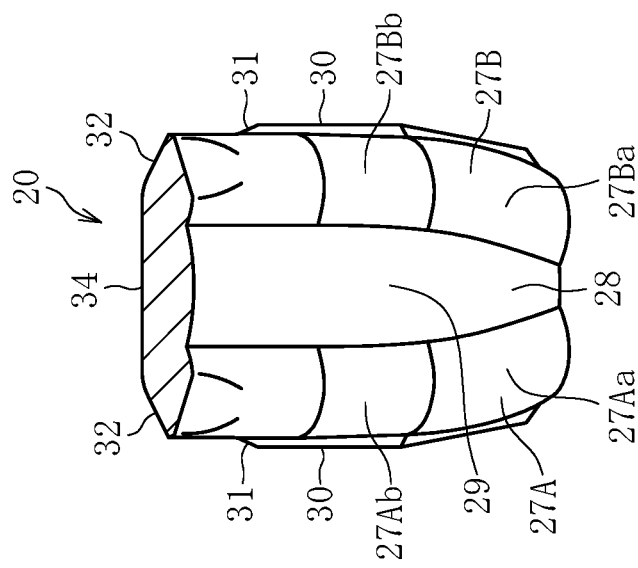
FIG. 13a is an illustration of a forming part at a distal end of the forging die of FIG. 12a, and is a perspective view of the punch.

The forging method according to this embodiment involves subjecting the pre-processing material W1 to the cold ironing. A die to be used in the forging method is described with reference to FIG. 12 to FIG. 17. FIG. 12a is a perspective view for illustrating punches, and FIG. 12b is a perspective view for illustrating a punch base. FIG. 13a is an enlarged perspective view of a distal end portion of the punch, and FIG. 13b is a further enlarged developed view of an outer peripheral surface of the punch of FIG. 13a. As illustrated in FIG. 12a and FIG. 13a, punches 20 are divided into four parts. On an outer peripheral portion of a distal end of each punch 20, there are formed first track groove portion forming surfaces 27Aa and 27Ba for forming the first track groove portions 7Aa and 7Ba (see FIG. 7), and second track groove portion forming surfaces 27Ab and 27Bb for forming the second track groove portions 7Ab and 7Bb (see FIG. 7). As illustrated in FIG. 13b, the first track groove portion forming surfaces 27Aa and 27Ba and the second track groove portion forming surfaces 27Ab and 27Bb are each inclined at an angle Y in the circumferential direction with respect to the joint axial line N-N (see FIG. 2a). At a position corresponding to the opening side end portion A of the first track groove portions 7Aa and 7Ba (see FIG. 2a), the track groove portion forming surfaces 27Aa and 27Ab are continuous with each other, and the track groove portion forming surfaces 27Ba and 27Bb are continuous with each other.

Between the first track groove portion forming surfaces 27Aa and 27Ba, a spherical forming surface 28 for forming the spherical inner peripheral surface 6 is formed in a region from an axial position of the joint center O (see FIG. 2a) to a distal end of the punch 20 (far side of the joint), and a cylindrical forming surface 29 is formed in a region from the spherical forming surface 28 to the axial center side of the punch 20 (on the upper side of FIG. 12a and FIG. 13b).

The first track groove portion forming surface 27Aa and the second track groove portion forming surface 27Ab are collectively referred to as "track groove forming surface 27A", and the first track groove portion forming surface 27Ba and the second track groove portion forming surface 27Bb are collectively referred to as "track groove forming surface 27B".

As illustrated in FIG. 12a, an end surface of the punch 20 in the circumferential direction comprises abutment surfaces 30 to be held in abutment against flange surfaces 36a (see FIG. 12b) of the punch base 21 at the time of radially expanding the punch 20 described later, and stepped surfaces 32 for forming a radial contraction space for the punches 20, which are formed through tapered stepped portions 31 from the abutment surfaces 30. Chamfered portions 33 are formed on the abutment surfaces 30 of each punch 20 so as to suppress nipping of the material at the time of formation.

An inner abutment surface 34 to be guided by the punch base 21 is formed on a radially inner side of the punch 20. The four punches 20 are radially contracted to bring the abutment surfaces 30 in the circumferential direction into abutment against each other. At this time, a contour of a transverse section formed by the four inner abutment surfaces 34 becomes a square shape. A projecting portion 35 is formed on another end portion of the punch 20 (on the upper side of FIG. 12a), and a surface of the projecting portion 35 in the axial direction serves as a positioning tapered stepped portion 44.

In the structures employed in the related-art forming method 1 and the forming method 2, one punch is arranged for one track groove to be subjected to cold processing. In contrast, in the structure of this embodiment, the pair of adjacent track groove forming surfaces 27A and 27B are arranged in one punch 20. That is, unlike the related-art punch arrangement, a gap between the punches for the pair of adjacent track groove forming surfaces 27A and 27B is eliminated, and the pair of track groove forming surfaces 27A and 27B are integrally formed on one punch 20. Therefore, the sectional area of the punch 20 in this embodiment is about 3 to 4.5 times larger than the sectional area of the related-art punch. The sectional area per track groove forming surface is increased to be 1.5 to 2.25 times larger than that in the related art, and the bending rigidity is increased to be more than 4.2 times larger than that in the related art. That is, with the increase in structural strength and rigidity, formation with high accuracy can be attained. Further, the region having a small thickness of a shoulder portion of the punch is eliminated. Thus, stress concentration is alleviated, thereby being capable of prolonging the life of the die.

Figure 14:
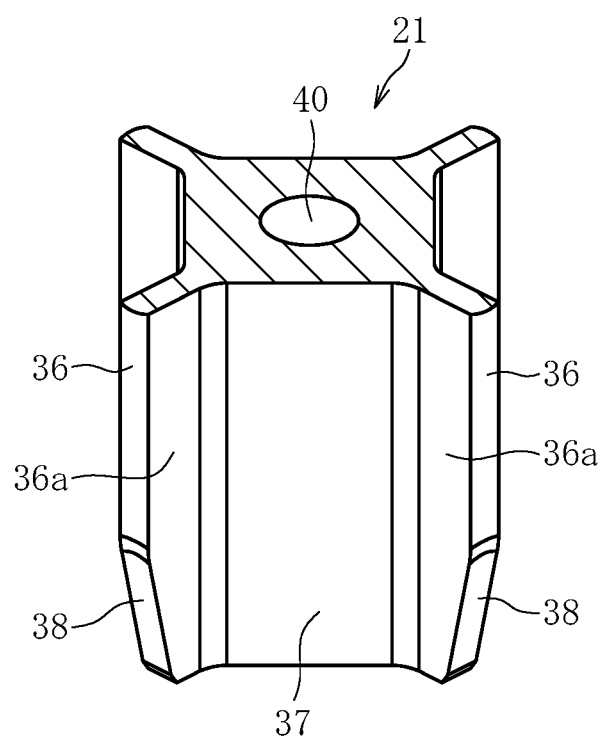
FIG. 14 is a perspective view of a distal end portion of the punch base.
Figure 16:
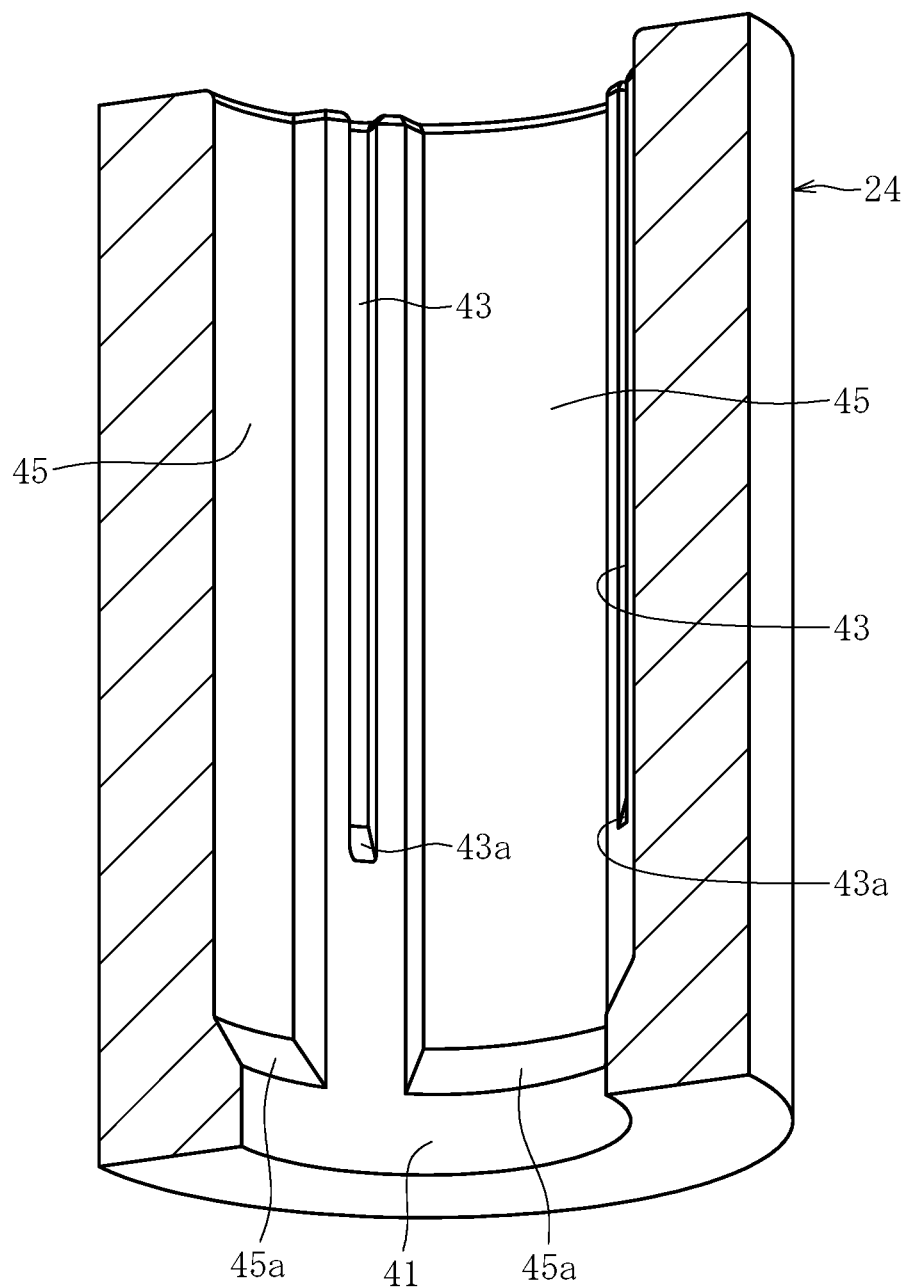
FIG. 16 is a perspective view of a punch holder as viewed in longitudinal section.

Next, the punch base 21 configured to guide the punch 20 so as to enable advancing and retreating is described with reference to FIG. 12b and FIG. 14. FIG. 14 is a perspective view of the distal end portion of the punch base 21 as viewed in a direction different from that in FIG. 12b. The punch base 21 has a substantially quadrangular prism shape, and comprises four bottom surfaces 37 configured to guide the inner abutment surfaces 34 of the punches 20, and flange portions 36 configured to guide the abutment surfaces 30 of the punches 20 in the circumferential direction from the corner portions of the four bottom surfaces 37. The flange surfaces 36a are formed on both sides of each of the flange portions 36. On a distal end portion of each of the flange portions 36 (on the lower side of FIG. 12b), a tapered surface 38 with a contour corresponding to that of the chamfered portion 33 of the punch 20 described above is formed. On another end portion of the flange portion 36 (on the upper side of FIG. 12b), a projecting portion 39 is formed, and a surface of the projecting portion 39 in the axial direction serves as a positioning tapered stepped portion 42. At the center of the punch base 21, there is formed a through hole 40 through which a shaft portion of an umbrella punch 22 (see FIG. 15b) is inserted so as to enable advancing and retreating.

In a case of the cold processing in the related-art forming method 1 and the forming method 2, a punch base in a region, which corresponds to the track grooves and is close to the distal end sides of the punches, is thin, and the amount of radial contraction of the punches is restricted. In this embodiment, the pair of adjacent track groove forming surfaces 27A and 27B are arranged in one punch 20. Therefore, the thickness can be increased as compared to the related-art punch base. With this, even in a case of an outer joint member of a constant velocity universal joint that has a large number of track grooves and is capable of forming a high operating angle, an outer joint member of a track groove crossing type that has a required track length can be formed.

Figure 21:
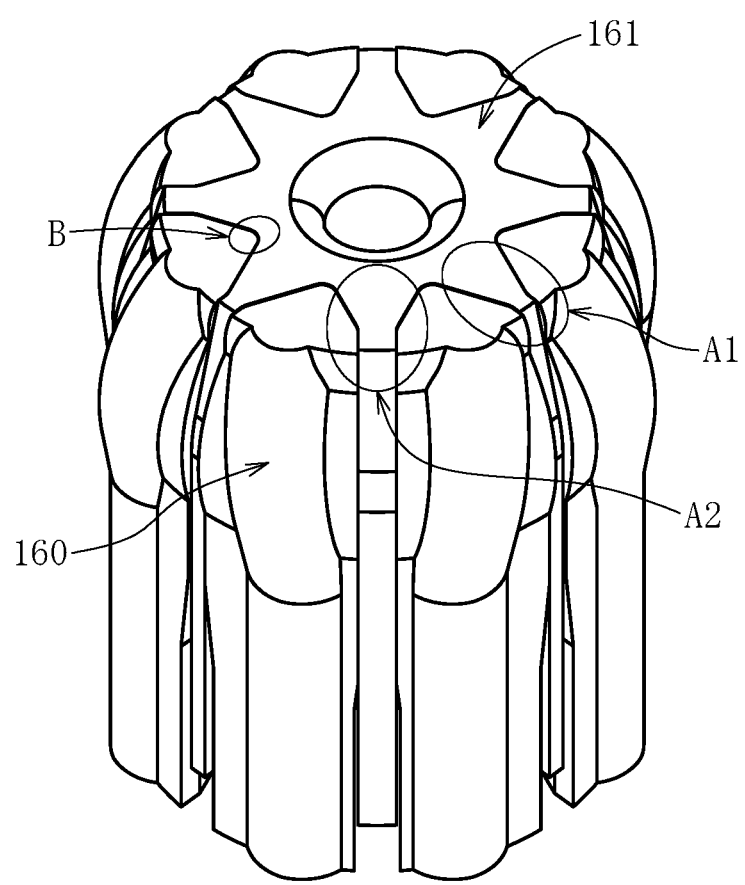
FIG. 21 is a perspective view for illustrating a state in which the punches and the punch base are combined with each other, for illustrating findings in the course of development.

Further, in the punch base 21, which is reduced in number of grooves formed by the bottom surfaces 37 and the flange surfaces 36a configured to guide the punches 20, the sectional shape of the groove is changed from the sharp corner shape (see the part B of FIG. 21) to the shape of the smooth bottom surface 37. Thus, the stress concentration is alleviated, thereby being capable of prolonging the life of the punch base 21. Further, with the above-mentioned reduction in number of grooves, the rigidity of the integrated punch base 21 is increased, thereby giving an effect of enhancing accuracy of a forged product.

Next, a radially expanding and contracting operation and a relative advancing and retreating operation of the punches 20 and the punch base 21 are described with reference to FIG. 15a and FIG. 15b. FIG. 15a is a perspective view for illustrating a radially expanded state of the punches 20, and FIG. 15b is a perspective view for illustrating a radially contracted state of the punches 20. A punch set in the description and the claims refers to a set including the punches 20 and the punch base 21 illustrated in FIG. 15a and FIG. 15b, and more preferably, refers to a set including the punches 20, the punch base 21, and the umbrella punch 22. The punch set is denoted by reference symbol T. As illustrated in FIG. 15a, the flange portions 36 of the punch base 21 are inserted between the abutment surfaces 30 (see FIG. 15b) of the punches 20. At the same time, each of the abutment surfaces 30 and each of the flange surfaces 36a are brought into abutment against each other, and the distal end surfaces of the respective punches 20 and the distal end surface of the punch base 21 are brought into abutment against a back surface 22a of the umbrella punch 22 to be arrayed. With this, the respective punches 20 are retained with respect to the joint center O (see FIG. 1a). This state corresponds to the radially expanded state of the punches 20.

The respective punches 20 are guided from the radially expanded state of FIG. 15a along the bottom surfaces 37 and the flange surfaces 36a of the punch base 21 to advance downward. Then, when the distal ends of the flange surfaces 36a of the punch base 21 pass by the tapered stepped portions 31 of the punches 20, the gap is formed between each of the stepped surfaces 32 of the punches 20 and each of the flange surfaces 36a of the punch base 20 so that the radial contraction space for the punches 20 is secured. In this manner, as illustrated in FIG. 15b, the punches 20 are brought into the radially contracted state.

The radially expanding and contracting operation and the relative advancing and retreating operation of the punches 20 and the punch base 21 are as described above. Meanwhile, the punches 20 and the punch base 21 are received and guided into an inner peripheral hole 41 of a punch holder 24 illustrated in FIG. 16, and perform the relative advancing and retreating operation described above. Specifically, in the inner peripheral hole 41 of the punch holder 24, there are formed axial grooves 43 in which the projecting portions 39 (see FIG. 15b) of the flange portions 36 of the punch base 21 are slidably fitted, and tapered stopper surfaces 43a are formed at lower end portions of the axial grooves 43. The positioning tapered stepped portions 42 of the projecting portions 39 of the flange portions 36 of the punch base 21 are locked to the tapered stopper surfaces 43a, thereby determining a downward advancing stroke of the punch base 21. The outer peripheral surfaces of the flange portions 36 of the punch base 21 are guided along the inner peripheral hole 41 of the punch holder 24.

In the inner peripheral hole 41 of the punch holder 24, there are further formed axial grooves 45 in which the projecting portions 35 of the punches 20 (see FIG. 15a) are slidably fitted, and tapered stopper surfaces 45a are formed at lower end portions of the axial grooves 45. The positioning tapered stepped portions 44 of the projecting portions 35 of the punches 20 are locked to the tapered stopper surfaces 45a, thereby determining a downward advancing stroke of the punches 20. Outer peripheral surfaces 20a of the punches 20 are guided along the inner peripheral hole 41 of the punch holder 24.

Due to the tapered stopper surfaces 43a and the tapered stopper surfaces 45a formed in the punch holder 24, the length of the advancing stroke of the punch base 21 is small, and the length of the advancing stroke of the punches 20 is large. With this, after the punch base 21 is stopped, advancement of the punches 20 continues through guiding of the abutment surfaces 30 of the punches 20 along the flange surfaces 36a of the punch base 21, and when the tapered stepped portions 31 of the punches 20 pass by the distal ends of the flange surfaces 36a of the punch base 21, the gap is formed between each of the stepped surfaces 32 of the punches 20 and each of the flange surfaces 36a of the punch base 20 so that the radial contraction space for the punches 20 is secured. In this manner, the radially contracting operation of the punches 20 can be performed with a simple mechanism.

Figure 17:
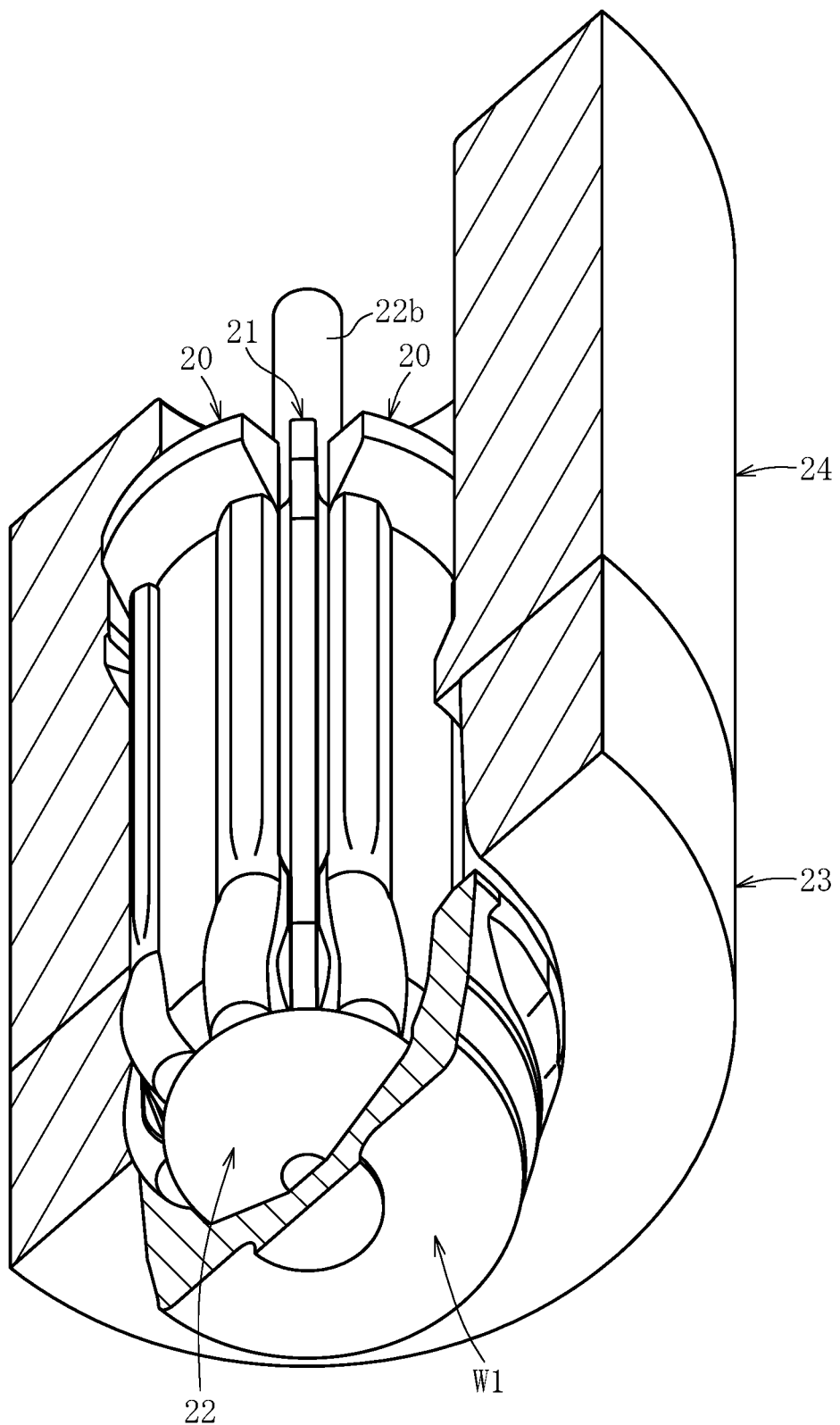
FIG. 17 is a perspective view for illustrating a state in which a die is set.

In a perspective view of FIG. 17, a state in which the die to be used in the forging method according to this embodiment is set is illustrated. The punches 20 and the punch base 21 are received in the punch holder 24, and the umbrella punch 22 is inserted through the punch base 21. A die 23 is mounted and fixed to a slide of a press machine described later together with the punch holder 24. FIG. 17 is an illustration of an arrangement state of the die when the umbrella punch 22, the punches 20, and the punch base 21 are inserted in the inner peripheral portion of the pre-processing material W1 and the die 23 starts formation of subjecting the outer peripheral portion of the pre-processing material W1 to the ironing (see FIG. 18b).

Next, the specific forming step is described with reference to FIG. 18 and FIG. 19. FIG. 18a to FIG. 18c are illustrations of a process from loading of the pre-processing material to the completion of formation. FIG. 19a to FIG. 19c are illustrations of a process to removing of the forged product after the completion of formation.

Figure 18A:
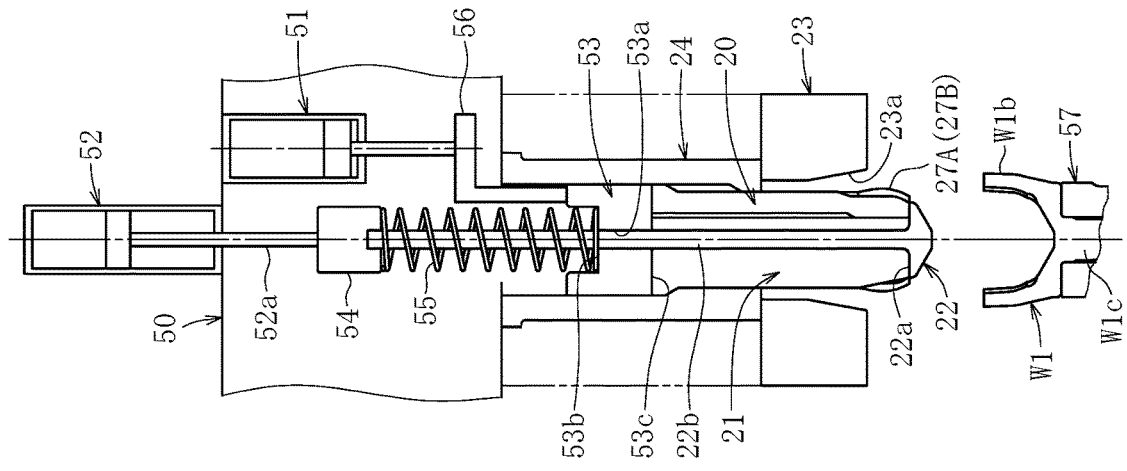
FIG. 18a is a schematic view for illustrating a state in which a workpiece is loaded in a forming step.
Figure 19A:
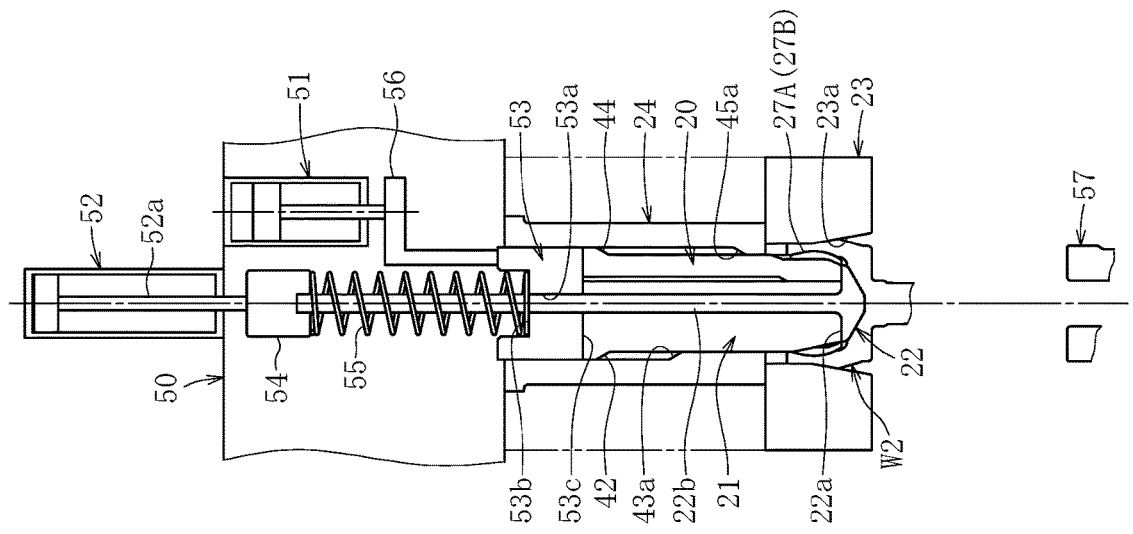
FIG. 19a is a schematic view for illustrating a state in which the workpiece is removed from a plate in a removing step.

With reference to FIG. 18a, the outlines of the die mounted to the press machine and a pressurizing device are described. The die set including the die 23 and the punch holder 24 receiving the punch 20, the punch base 21, the umbrella punch 22, and the like, a pressurizing cylinder 51, and a knockout cylinder 52 are mounted and fixed to a slide 50 configured to be raised and lowered by, for example, a hydraulic drive source of the press machine. The punches 20, the punch base 21, the umbrella punch 22, and a pressing member 53 are slidably received inside the punch holder 24.

A shaft portion 22b of the umbrella punch 22 is slidably fitted through a through hole 53a formed at the center of the pressing member 53. The shaft portion 22b of the umbrella punch 22 is coupled to a rod 52a of the knockout cylinder 52 through intermediation of a spring receiving member 54. A spring receiving portion 53b is formed on an upper surface of the pressing member 53, and a compression coil spring 55 is incorporated between the spring receiving portion 53b and the spring receiving member 54. Due to an urging force of the compression coil spring 55, the punches 20 and the punch base 21 are retained and arrayed between the back surface 22a of the umbrella punch 22 and a lower surface 53c of the pressing member 53. The pressurizing cylinder 51 presses the pressing member 53 through intermediation of a coupling member 56. A plate 57 is mounted and fixed to a lower portion of the press machine, and the pre-processing material W1 is set on the plate 57.

Detailed description is given of the forming step. As illustrated in FIG. 18a, in a state in which a workpiece is loaded, the slide 50 is positioned at a top dead center, and a certain pressure is applied to the pressurizing cylinder 51, whereas a pressure is not applied to the knockout cylinder 52. The pressure state of the pressurizing cylinder 51 and the knockout cylinder 52 is maintained until the completion of formation. In this state, the pre-processing material W1 is set on the plate 57 so as to align a phase thereof with phases of the punches 20.

Figure 18B:
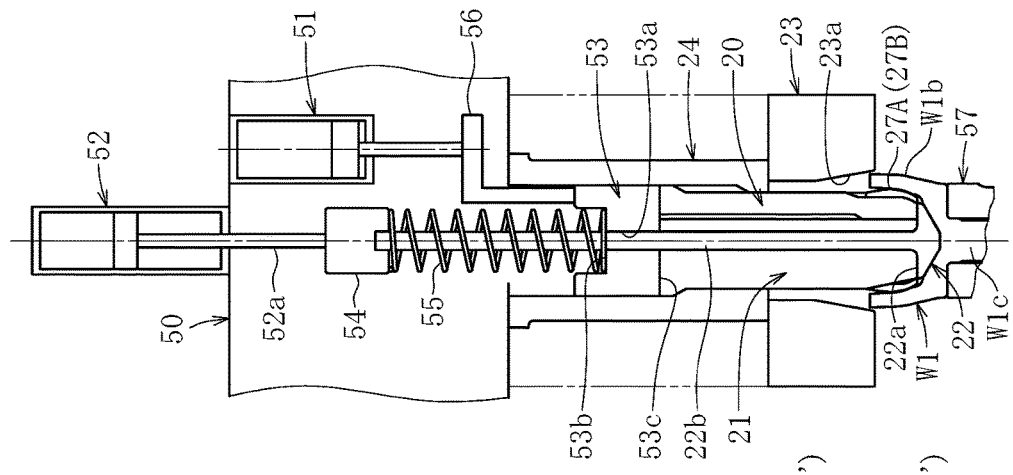
FIG. 18b is a schematic view for illustrating a state in which formation is started in the forming step.

After the workpiece is loaded, as illustrated in FIG. 18b, in a state in which formation is started, the pressurizing cylinder 51 is in a state of receiving a certain pressure load so that the slide 50 is lowered, the umbrella punch 22 is brought into abutment against a cup bottom surface of the pre-processing material W1 while keeping a constant pressure, and the slide 50 is lowered up to a position at which an opening end portion of the pre-processing material W1 faces a die hole 23a of the die 23.

Figure 18C:
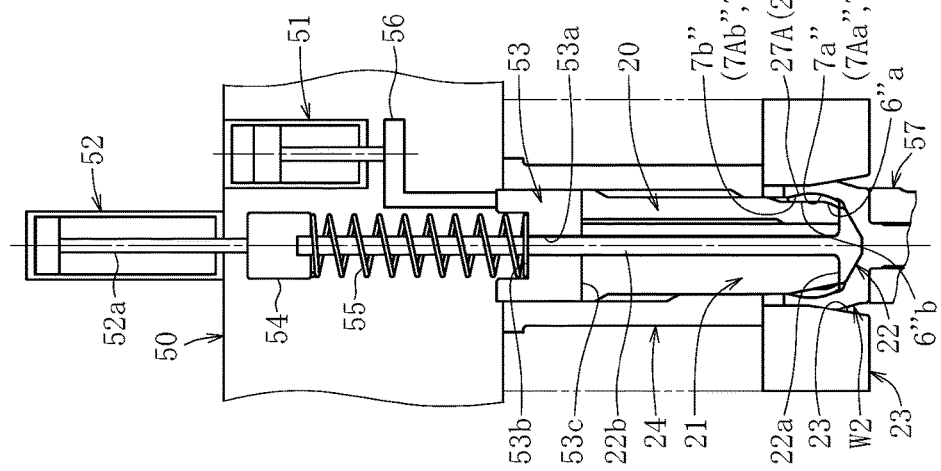
FIG. 18c is a schematic view for illustrating a state in which the formation is completed in the forming step.

In the state in which the umbrella punch 22 is held in abutment against the cup bottom surface of the pre-processing material W1 while keeping the constant pressure, and the axial positions of the track groove forming surfaces 27A and 27B of each of the punches 20 are stabilized, as illustrated in FIG. 18c, the die 23 is lowered to press the outer peripheral surface from the opening side of the pre-processing material W1, the slide 50 reaches a bottom dead center, and the inner peripheral portion of the pre-processing material W1 is pressed against the track groove forming surfaces 27A and 27B, the spherical forming surface 28, and the cylindrical forming surface 29 of each of the punches 20. In this manner, finishing formation of the track groove surfaces 7a' and 7b', the spherical inner peripheral surface 6'a on the far side, and the cylindrical inner peripheral surface 6'b on the opening side in the entire region in the axial direction is completed.

Specifically, on the far side of the pre-processing material W1, the first track groove surfaces 7a' (7Aa' and 7Ba') having a substantially finished shape become first track groove surfaces 7a"(7Aa" and 7Ba") having a finished shape, and the spherical inner peripheral surface 6'a having a substantially finished shape becomes a spherical inner peripheral surface 6"a having a finished shape. Further, on the opening side of the pre-processing material W1, the second track groove surfaces 7b' (7Ab' and 7Bb') having a preliminary shape become second track groove surfaces 7b" (7Ab" and 7Bb") having a finished shape, and the substantially cylindrical inner peripheral surface 6'b having a preliminary shape becomes a substantially cylindrical inner peripheral surface 6"b having a finished shape. The finished shape in the description refers to a shape to be kept in the forged product.

In the above-mentioned formation, the protruding portions W1a are formed on the pre-processing material W1. Thus, a sufficient amount of the material is secured at the time of formation of increasing the intervals between the second track groove surfaces 7Ab' and 7Bb' having a preliminary shape in the circumferential direction on the opening side.

Due to a springback phenomenon after the completion of formation, a forged product W2 is in a state of being held by the die 23. As described above, through the ironing in which the die 23 presses and pushes the outer peripheral surface from the opening portion side of the pre-processing material W1, the material sufficiency at the inner peripheral portion of the pre-processing material W1 can be enhanced. With the structure in which the above-mentioned pair of track groove forming surfaces 27A and 27B are integrally formed on one punch 20 and the ironing involving pushing from the opening portion side of the cylindrical portion W1b of the pre-processing material W1, formation with high accuracy, prolongment in life of the die, and the like can be further promoted.

After the completion of formation, a removing step for the forged product W2 is performed. The pressure applied by the pressurizing cylinder 51 is relieved so that the pressure applied by the umbrella punch 22 to the cup bottom surface of the forged product W2 is eliminated. Then, as illustrated in FIG. 19a, the slide 50 is raised so that the forged product W2, the punches 20, the punch base 21, and the umbrella punch 22, which are held inside the die 23, are raised. Thus, the forged product W2 is removed from the plate 57 so that the slide 50 reaches the top dead center.

Figure 19B:
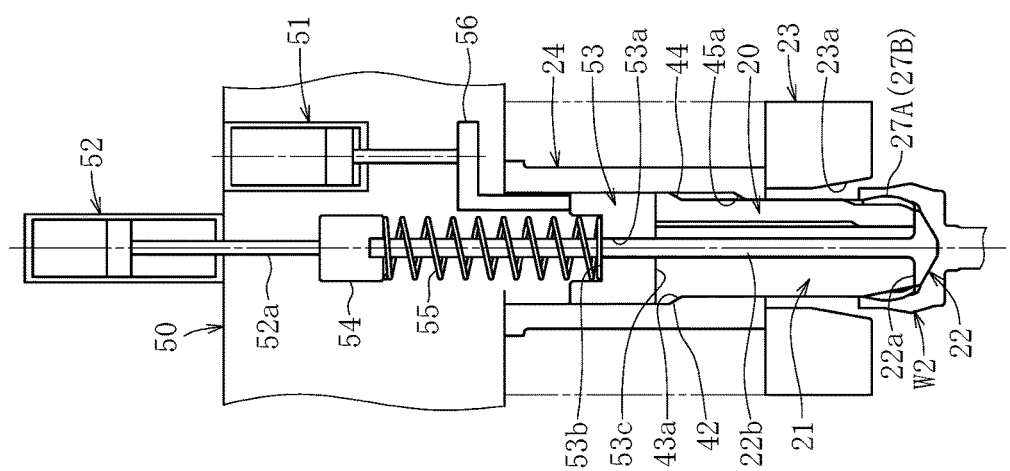
FIG. 19b is a schematic view for illustrating the state in which the workpiece is removed from the die in the removing step.

After that, as illustrated in FIG. 19b, the pressure is applied to the pressurizing cylinder 51 so that the umbrella punch 22 presses the cup bottom surface of the forged product W2 through intermediation of the punches 20 and the punch base 21, and the forged product W2 is separated from the die 23. When the punch base 21 is lowered up to this state, the tapered stepped portions 42 of the punch base 21 are locked to the tapered stopper surfaces 43a of the punch holder 24, and the lowering operation of the punch base 21 is stopped.

Figure 19C:
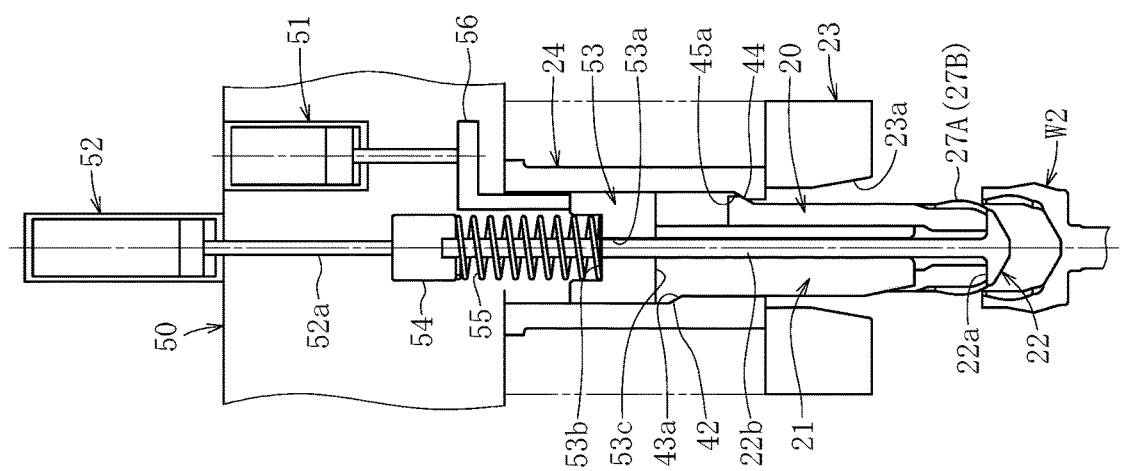
FIG. 19c is a schematic view for illustrating the state in which the workpiece is removed from the punches in the removing step.

After that, as illustrated in FIG. 19c, the pressure is applied to the knockout cylinder 52 so that the punches 20 designed to have a process length larger than the process length of the punch base 21 are further lowered. Then, the positioning tapered stepped portions 44 of the punches 20 are locked to the tapered stopper surfaces 45a of the punch holder 24, and the stepped surfaces 32 of the punches 20 reach the distal end portions of the flange portions 36 of the punch base 21. With this, the gap is formed between each of the stepped surfaces 32 of the punches 20 and each of the flange surfaces 36a of the punch base 21 so that the punches 20 are radially contracted and the forged product W2 is removed. The forged product W2 is then subjected to turning, spline processing, heat treatment, grinding, and the like to be processed into the finished product illustrated in FIG. 7.

The forging method according to this embodiment is completed through the above-mentioned processes of FIG. 18a to FIG. 18c and FIG. 19a to FIG. 19c. With the forging method according to this embodiment, in the outer joint member of the constant velocity universal joint, which comprises the track grooves having an arc shape and being inclined in the circumferential direction, the track grooves with high accuracy can be formed while a forging tool can be reduced in cost and be prolonged in life.

In the one example of the constant velocity universal joint in which the outer joint member manufactured based on the forging method according to this embodiment is incorporated, the ball raceway center line Xb of the second track groove portion 7b and the ball raceway center line Yb of the second track groove portion 9b, which each have a linear shape, are exemplified. However, the present invention is not limited thereto, and the ball raceway center lines of the second track groove portions may have a recessed arc shape or a protruding arc shape having a relatively large curvature radius. In this case, the forming surface of the die for forming the second track groove portions may be suitably modified into a shape designed in consideration of the above-mentioned recessed arc shape or protruding arc shape.

Figure 20:
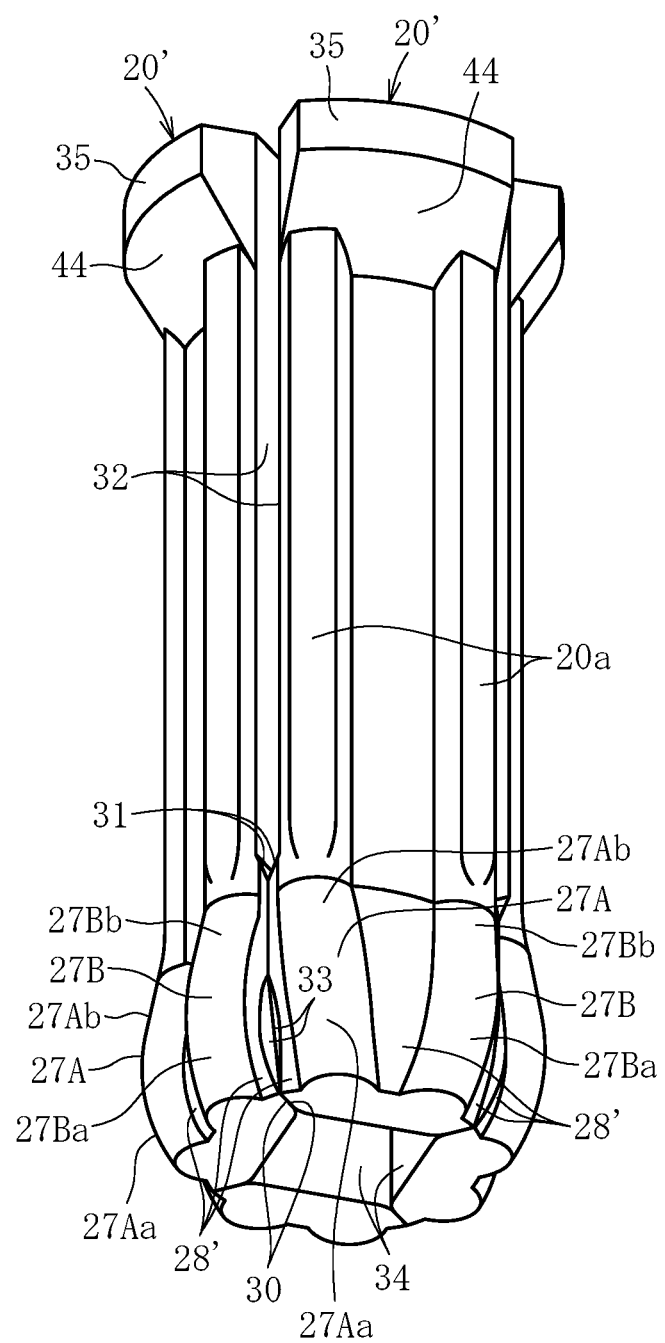
FIG. 20 is a perspective view for illustrating a modification example of the punches.

Next, a modification example of the punches is described with reference to FIG. 20. As the punches 20 used in the forging method according to the above-mentioned embodiment, the punches 20 each having the cylindrical forming surface 29 on the upper side with respect to the axial position of the joint center O, are exemplified. However, in punches of this modification example, the cylindrical forming surface 29 is changed into a spherical forming surface, and the entire region of the forming surface in the axial direction is formed as a spherical forming surface 28'. As illustrated in FIG. 20, in the punches 20', the spherical forming surface 28' is formed in the entire region of the forming surface in the axial direction. The punches 20' of this modification example can be suitably applied in consideration of a forming load, the life of the die, and the like. In this case, post-processing for the spherical inner peripheral surface can be eliminated. The configuration of the die is the same as that of the above-mentioned embodiment except that the entire region of the forming surface of each of the punches 20' in the axial direction is formed as the spherical forming surface 28'. Thus, parts that have the same function are denoted by the same reference symbols, and all of the details of the pre-processing material, the configuration of the die, the actions, the specific forming step, and the like described in the above-mentioned embodiment are similarly applied.

Figure 22B:
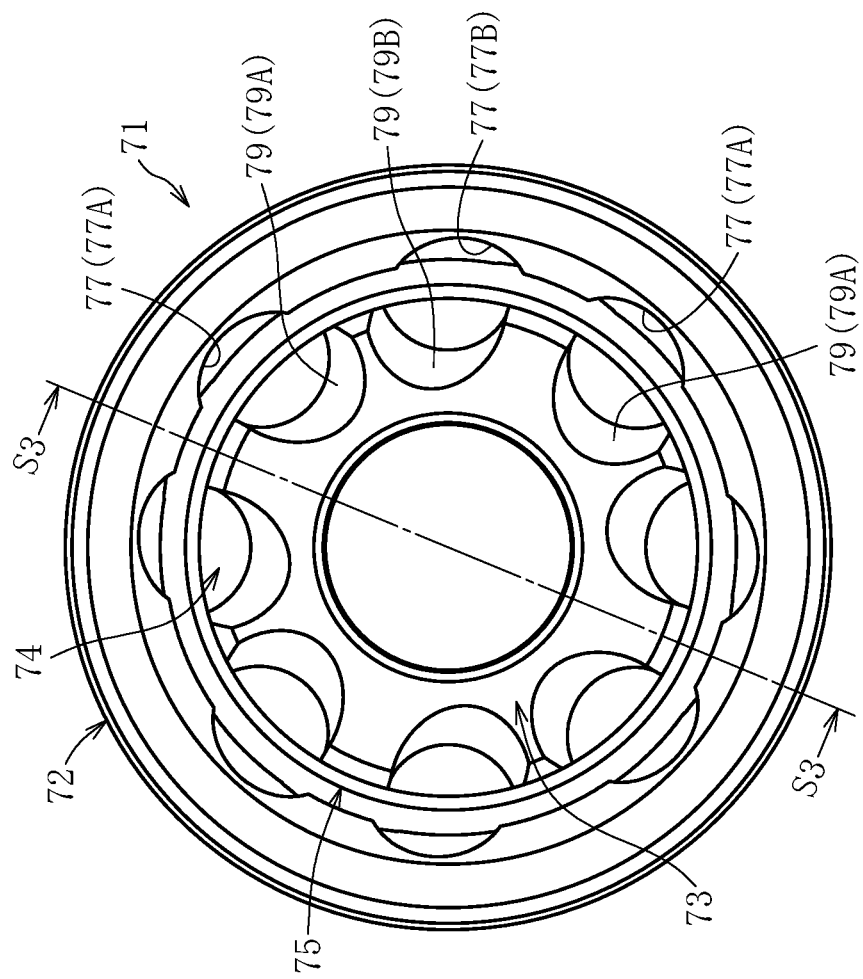
FIG. 22b is a side view for illustrating the constant velocity universal joint in the another mode in which the outer joint member manufactured based on the forging method according to one embodiment of the present invention is incorporated.
Figure 22A:
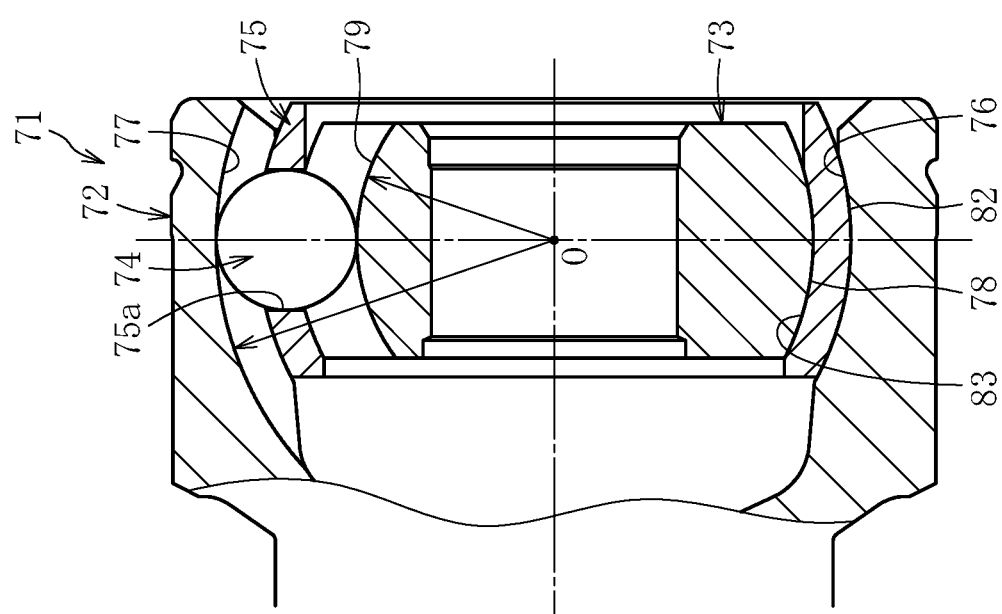
FIG. 22a is a longitudinal sectional view for illustrating a constant velocity universal joint in another mode in which an outer joint member manufactured based on the forging method according to one embodiment of the present invention is incorporated.

Next, a constant velocity universal joint in another mode to which the forging method according to the embodiment of the present invention is applied is described with reference to FIG. 22a to FIG. 24. FIG. 22a is a longitudinal sectional view of the constant velocity universal joint in the another mode, and FIG. 22b is a side view of the constant velocity universal joint in the another mode. The constant velocity universal joint 71 is also of a track groove crossing type, and mainly comprises an outer joint member 72, an inner joint member 73, a plurality of balls 74 configured to transmit torque, and a cage 75. The outer joint member 72 has a plurality of (eight) track grooves 77 formed in a spherical inner peripheral surface 76. The inner joint member 73 has a plurality of track grooves 79 formed in a spherical outer peripheral surface 78, which are paired with the track grooves 77 of the outer joint member 72. The plurality of balls 74 are separately incorporated between the track grooves 77 of the outer joint member 72 and the track grooves 79 of the inner joint member 73, which are paired with each other. A spherical outer peripheral surface 82 and a spherical inner peripheral surface 83 of the cage 75 are fitted to the spherical inner peripheral surface 76 of the outer joint member 72 and the spherical outer peripheral surface 78 of the inner joint member 73, respectively, and the balls 74 are held in pockets 75a of the cage 75.

A curvature center of each of the track grooves 77 of the outer joint member 72 and a curvature center of each of the track grooves 79 of the inner joint member 73 are each matched with the joint center O, and offset amounts of both the track grooves 77 and 79 in the axial direction are set to 0. Further, a curvature center of the spherical inner peripheral surface 76 of the outer joint member 72 and a curvature center of the spherical outer peripheral surface 78 of the inner joint member 73 are each matched with the joint center O.

Figure 23:
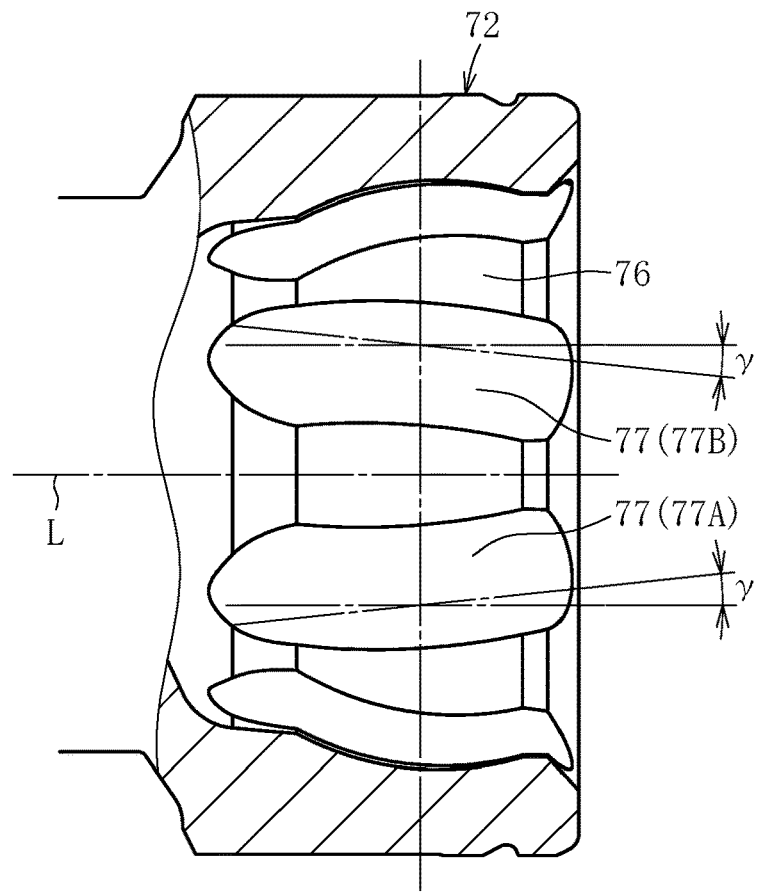

With reference to FIG. 23, an inclined state of the track grooves 77 of the outer joint member 72 in the circumferential direction is described. FIG. 23 is an illustration of an inner peripheral portion of the outer joint member 72 as viewed form a direction indicated by the arrows of the line S3-S3 of FIG. 22b. As illustrated in FIG. 23, the track grooves 77 of the outer joint member 72 are formed so as to be inclined in the circumferential direction, and the track grooves 77 adjacent to each other in the circumferential direction are inclined in mutually opposite directions. That is, a track groove 77A is inclined with respect to the axis line L at an angle Y from the far side to the opening side in a counterclockwise direction, and a track groove 77B adjacent to the track groove 77A in the circumferential direction is inclined with respect to the axis line L at an angle Y from the far side to the opening side in a clockwise direction. That is, the track grooves 77 adjacent to each other in the circumferential direction are inclined in mutually opposite directions.

Figure 24:
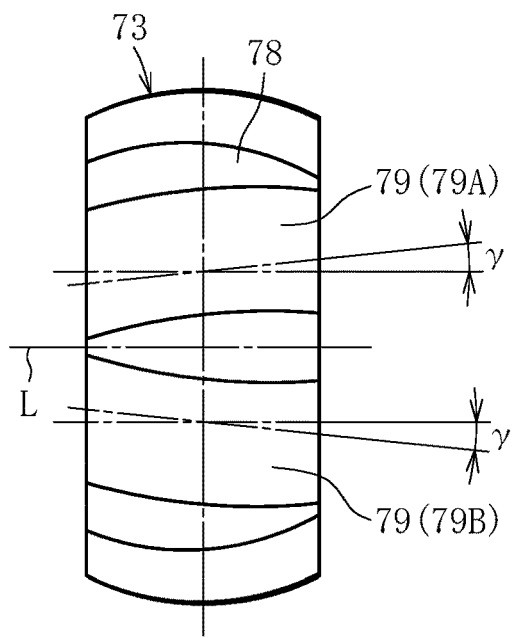
Figure 25:
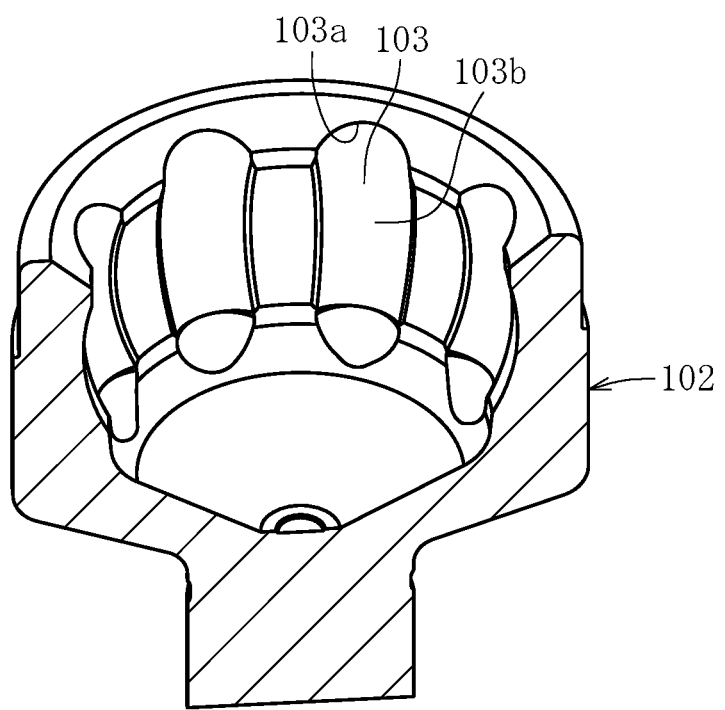
FIG. 25 is a perspective view of an outer joint member of a Rzeppa constant velocity universal joint as viewed in longitudinal section.
Figure 26:
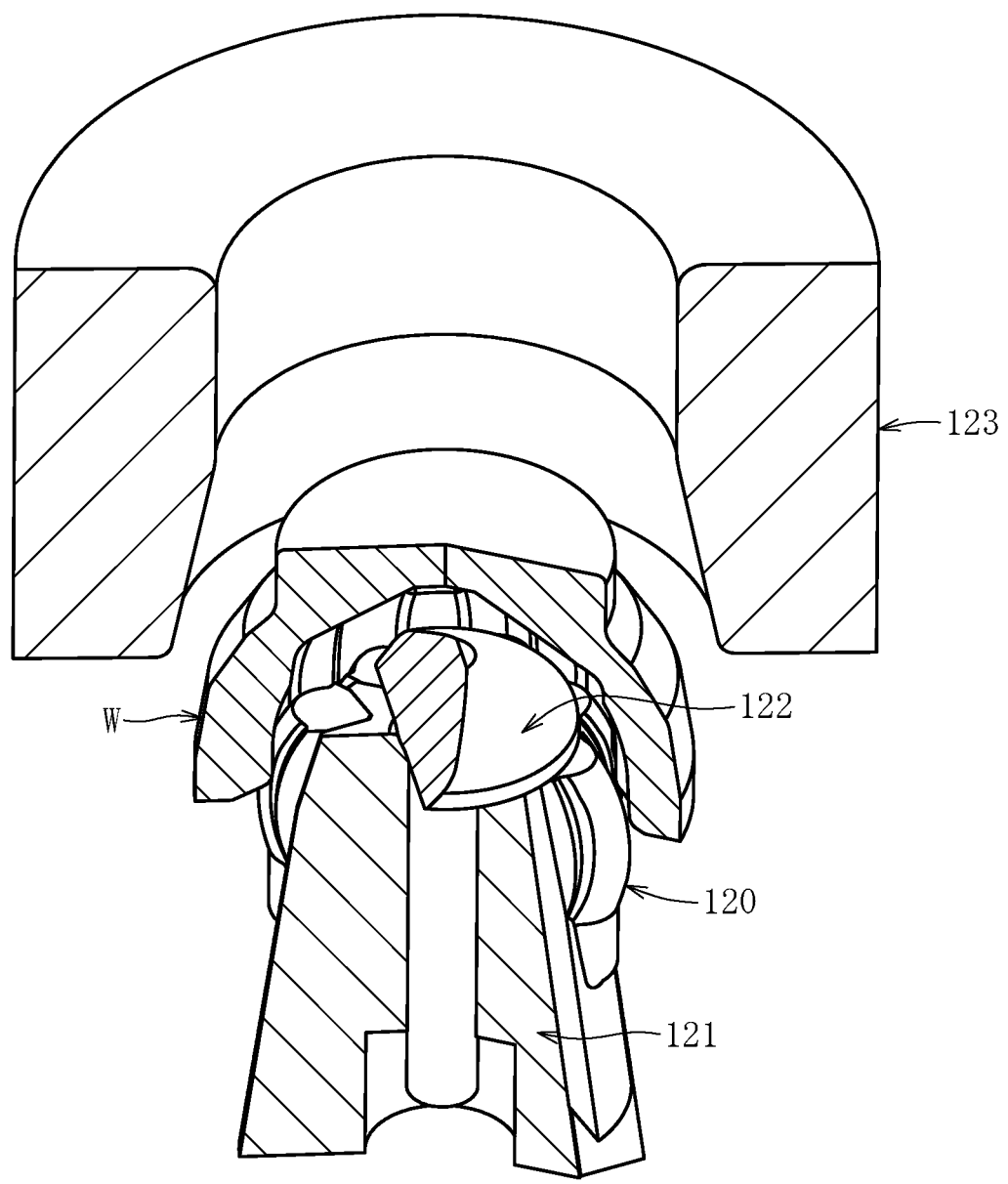
FIG. 26 is a perspective view for illustrating a related-art forging die.
Figure 27A:
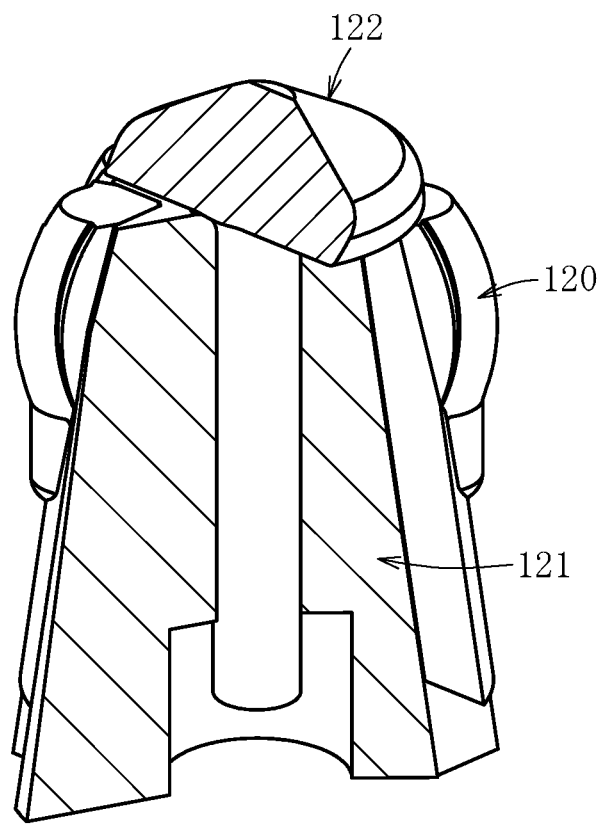
FIG. 27a is an illustration of the related-art forging die, and is a perspective view of a state in which punches are radially expanded as viewed in longitudinal section.
Figure 27B:
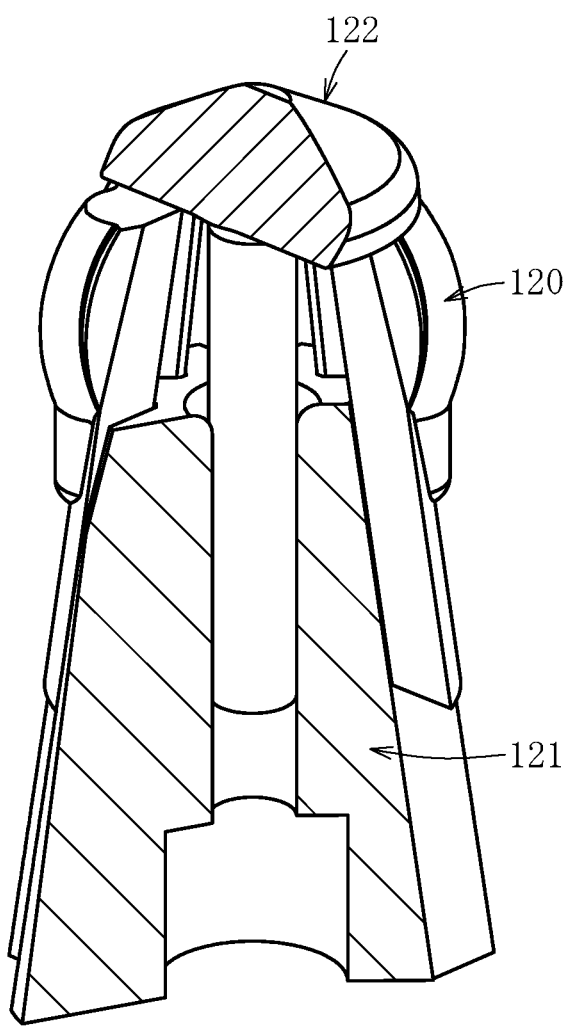
FIG. 27b is an illustration of the related-art forging die, and is a perspective view of a state in which the punches are radially contracted as viewed in longitudinal section.
Figure 28:
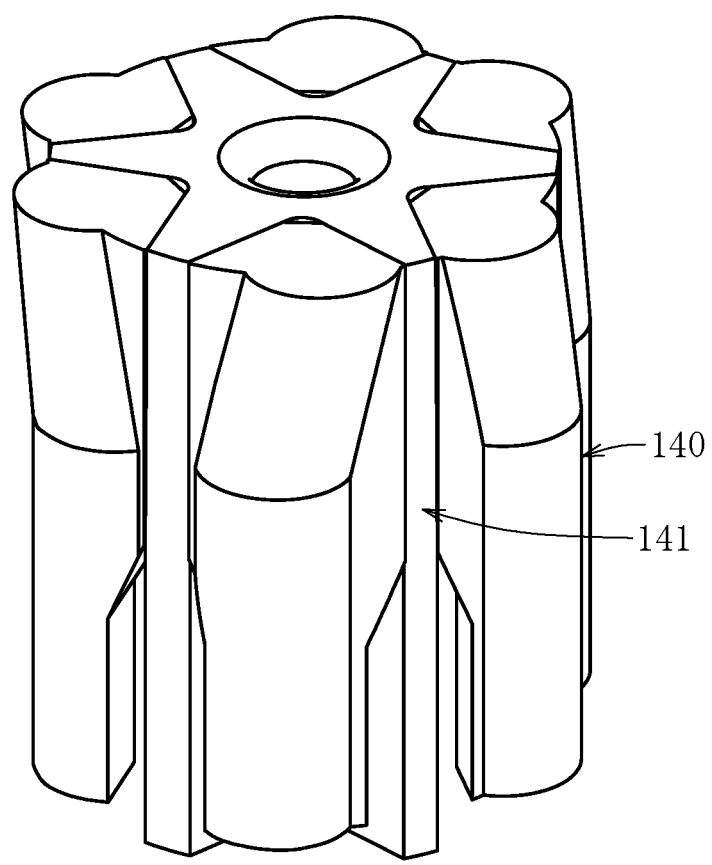
FIG. 28 is a perspective view for illustrating a related-art forging die.
Figure 29A:
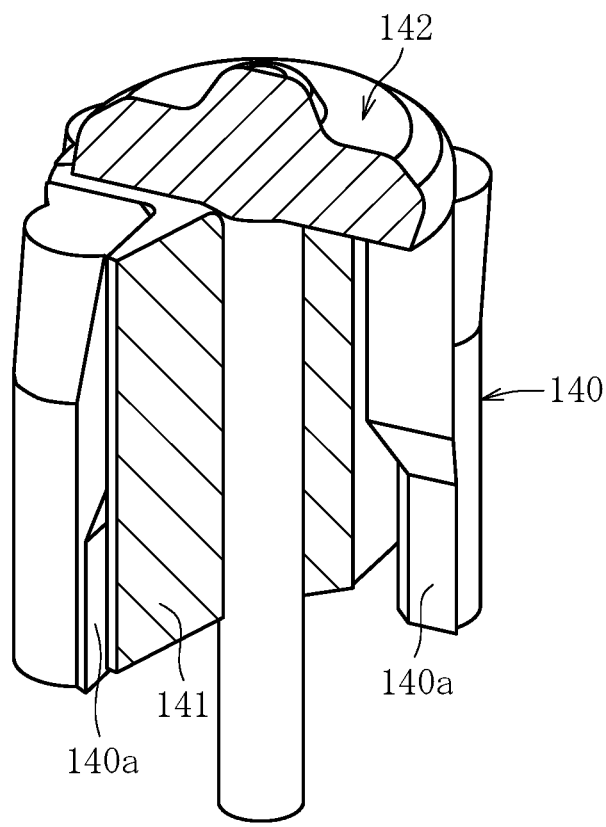
FIG. 29a is an illustration of the related-art forging die, and is a perspective view of a state in which punches are radially expanded as viewed in longitudinal section.
Figure 29B:
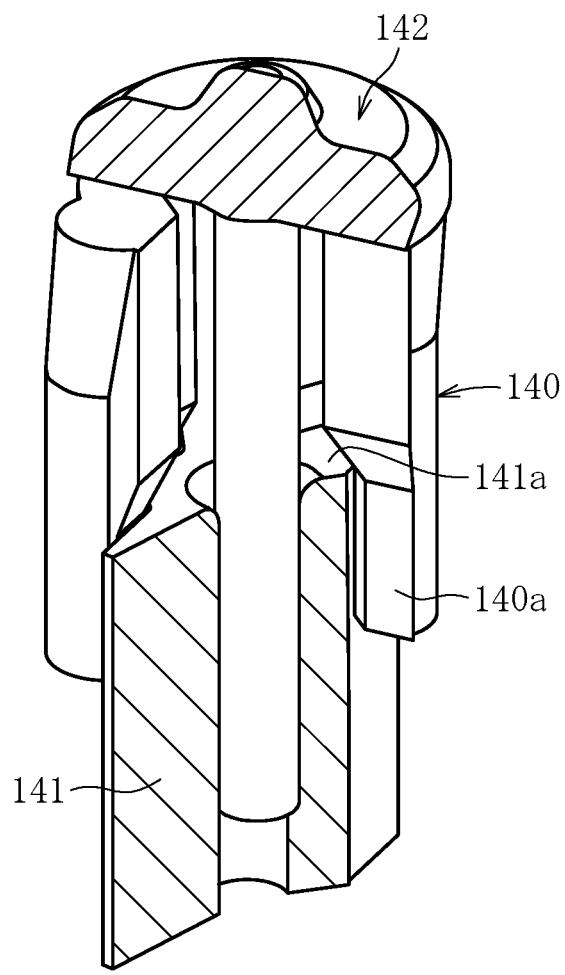
FIG. 29b is an illustration of the related-art forging die, and is a perspective view of a state in which the punches are radially contracted as viewed in longitudinal section.

With reference to FIG. 24, an inclined state of the track grooves 79 of the inner joint member 73 in the circumferential direction is described. FIG. 24 is an illustration of an outer peripheral portion of the inner joint member 73 as viewed in a plane separated in parallel from the cross section taken along the arrows of the line S3-S3 of FIG. 22b. As illustrated in FIG. 24, the track grooves 79 of the inner joint member 73 are formed so as to be inclined in the circumferential direction, and the track grooves 79 adjacent to each other in the circumferential direction are inclined in mutually opposite directions. That is, a track groove 79A is inclined with respect to the axis line L at an angle Y from the far side to the opening side in a counterclockwise direction, and a track groove 79B adjacent to the track groove 79A in the circumferential direction is inclined with respect to the axis line L at an angle Y from the far side to the opening side in a clockwise direction. That is, the track grooves 79 adjacent to each other in the circumferential direction are inclined in mutually opposite directions.

As described above, in the constant velocity universal joint 71, the track grooves 77 of the outer joint member 72 and the track grooves 79 of the inner joint member 73, which are inclined in the circumferential direction, each have an arc shape over the entire region in the axial direction. The track grooves 77 of the outer joint member 72 and the track grooves 79 of the inner joint member 73, which are paired with each other, are inclined in the opposite directions with respect to the axis line.

Therefore, also in the constant velocity universal joint 71, the curvature centers of the track grooves 77 of the outer joint member 72 and the curvature centers of the track grooves 79 of the inner joint member 73 are not offset in the axial direction. Further, the track grooves 77A inclined in the circumferential direction and the track grooves 77B inclined in the opposite direction are crossed with each other alternately in the circumferential direction, and the track grooves 79A inclined in the circumferential direction and the track grooves 79B inclined in the opposite direction are crossed with each other alternately in the circumferential direction. Thus, forces in the mutually opposite directions are applied to the pockets 75a of the cage 75, which are adjacent to each other in the circumferential direction, with the result that the cage 75 is stabilized at the position of the joint center O. Therefore, contact between the spherical outer peripheral surface 82 of the cage 75 and the spherical inner peripheral surface 76 of the outer joint member 72 and contact between the spherical inner peripheral surface 83 of the cage 75 and the spherical outer peripheral surface 78 of the inner joint member 73 are suppressed. Accordingly, the constant velocity universal joint is smoothly operated under high load and in high speed rotation, and heat generation is suppressed. As a result, the durability is enhanced.

Also in the above-mentioned method of forging the outer joint member 72 of the constant velocity universal joint 71, a material similar to the above-mentioned pre-processing material W1 is formed by sub-hot forging, and, through use of a set of a die corresponding to the shape of the track grooves 77 of the outer joint member 72, similarly to the forging method according to the above-mentioned embodiment, the outer joint member 72 can be formed by ironing. All of the details of the configuration of the die, the actions, the specific forming step, and the like described in the above-mentioned embodiment are similarly applied.

As the example of the constant velocity universal joint in which the outer joint member manufactured based on the forging method according to this embodiment is incorporated, the following constant velocity universal joint is exemplified. Specifically, the track grooves 7 of the outer joint member 2 are inclined in the circumferential direction so that the track grooves 7A and 7B adjacent to each other in the circumferential direction are inclined in directions opposite to each other. The track grooves 9 of the inner joint member 3 are inclined in the circumferential direction so that the track grooves 9A and 9B adjacent to each other in the circumferential direction are inclined in directions opposite to each other. The track grooves 77 of the outer joint member 72 are inclined in the circumferential direction so that the track grooves 77A and 77B adjacent to each other in the circumferential direction are inclined in directions opposite to each other. The track grooves 79 of the inner joint member 73 are inclined in the circumferential direction so that the track grooves 79A and 79B adjacent to each other in the circumferential direction are inclined in directions opposite to each other. However, the present invention is not limited thereto, and may be applied to the following constant velocity universal joint. Specifically, all the track grooves of the outer joint member are inclined in the same direction in the circumferential direction, all the track grooves of the inner joint member are inclined in the same direction in the circumferential direction, and the track grooves of the outer joint member and the track grooves of the inner joint member are inclined in opposite directions. Also in this case, the balls are arranged in crossing portions of the track grooves of the outer joint member and the track grooves of the inner joint member.

As the example of the constant velocity universal joint in which the outer joint member manufactured based on the forging method according to this embodiment is incorporated, the case in which the number of balls configured to transmit torque is eight is exemplified. However, the present invention is not limited thereto, and six or ten or more balls may be provided.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1, 71 constant velocity universal joint
2, 72 outer joint member
3, 73 inner joint member
4 ball
5, 75 cage
6, 76 spherical inner peripheral surface
6'a spherical inner peripheral surface having substantially finished shape
6'b substantially cylindrical inner peripheral surface having preliminary shape
7, 77 track groove
7a first track groove portion
7a' first track groove surface having substantially finished shape
7b second track groove portion
7b' second track groove surface having preliminary shape
8, 78 spherical outer peripheral surface
9, 79 track groove
9a first track groove portion
9b second track groove portion
12, 82 spherical outer peripheral surface
13, 83 spherical inner peripheral surface
20 punch
21 punch base
22 umbrella punch
23 die
23a die hole
24 punch holder
27A track groove forming surface
27B track groove forming surface
27Aa first track groove portion forming surface
27Ab second track groove portion forming surface
27Ba first track groove portion forming surface
27Bb second track groove portion forming surface
28 spherical forming surface
29 cylindrical forming surface
30 abutment surface
32 stepped surface
34 inner abutment surface
35 projecting portion
36 flange portion
37 bottom surface
39 projecting portion
42 positioning tapered stepped portion
43a tapered stopper surface
44 positioning tapered stepped portion
45a tapered stopper surface
50 slide
51 pressurizing cylinder
52 knockout cylinder
A end portion
B end portion
K perpendicular line
L straight line
M plane including ball raceway center line
N joint axial line
O joint center
P plane including joint center
Q plane including ball raceway center line
R straight line T punch set
W1 pre-processing material
W1a protruding portion
W1b cylindrical portion
W1c shaft portion
W2 forged product
X ball raceway center line
Y ball raceway center line
Y inclination angle
β angle
θ operating angle

The invention claimed is:
1. A method of forging an outer joint member of a constant velocity universal joint from a pre-processing material including a shaft portion and a cylindrical portion formed at one end of the shaft portion,
the constant velocity universal joint comprising:
  an outer joint member having a spherical inner peripheral surface in which at least eight track grooves are formed;
  an inner joint member having a spherical outer peripheral surface in which at least eight track grooves are formed so as to be paired with the track grooves of the outer joint member as a plurality of pairs of track grooves;
  at least eight balls, which are interposed between the track grooves of the outer joint member and the track grooves of the inner joint member, and are configured to transmit torque; and
  a cage, which is interposed between the spherical inner peripheral surface of the outer joint member and the spherical outer peripheral surface of the inner joint member, and is configured to hold the balls, wherein
the track grooves of the outer joint member and the track grooves of the inner joint member each have an arc-shaped ball raceway center line having a curvature center that is prevented from being offset in an axial direction with respect to a joint center,
for each of the track grooves of the outer joint member and each of the track grooves of the inner joint member, a plane including the arc-shaped ball raceway center line and the joint center is inclined in a circumferential direction with respect to a joint axial line,
each pair of the plurality of pairs of track grooves includes one track groove inclined in one direction and another track groove inclined in an opposite direction,
the method comprising performing ironing by press-fitting the cylindrical portion of the pre-processing material into a hole of a die in a state in which a punch set that is radially expandable and contractable is fitted to an inner peripheral surface of the cylindrical portion,
the punch set comprising:
  at least a plurality of punches; and
  a punch base configured to guide the punches so as to enable advancing and retreating,
  wherein each of the punches is a single element having a pair of forming surfaces for forming an adjacent pair of the at least eight track grooves of the outer joint member.

2. The method of forging an outer joint member of a constant velocity universal joint according to claim 1, wherein, in the ironing, the cylindrical portion is press-fitted into the hole of the die from an opening portion side of the cylindrical portion of the pre-processing material.

3. The method of forging an outer joint member of a constant velocity universal joint according to claim 1, wherein the punch set further comprises an additional punch configured to separate a forged product formed by the ironing of the pre-processed material from the die.

4. The method of forging an outer joint member of a constant velocity universal joint according to claim 1,
  wherein the punches and the punch base are received and guided into a punch holder, and
  wherein a length of an advancing stroke of the punches is larger than a length of an advancing stroke of the punch base.

5. The method of forging an outer joint member of a constant velocity universal joint according to claim 1,
  wherein the inner peripheral surface of the cylindrical portion of the pre-processing material has:
    an arc-shaped track groove surface having a first shape and being formed in a part of the inner peripheral surface at a far side of the cylindrical portion in an axial direction of the pre-processing material, the arc-shaped track groove surface extending in a direction that is inclined in a circumferential direction of the pre-processing material with respect to a central axis of the pre-processing material; and
    a linear track groove surface having a second shape and being formed in a part of the inner peripheral surface at an opening side of the cylindrical portion in the axial direction of the pre-processing material, the linear track groove surface extending in a direction that is free from incline in the circumferential direction of the pre-processing material with respect to the central axis of the pre-processing material,
  wherein a distal end of the arc-shaped track groove surface with respect to the shaft portion of the pre-processing material is continuous with a proximal end of the linear track groove surface with respect to the shaft portion of the pre-processing material, such that a ball raceway center line of the arc-shaped track groove surface intersects a ball raceway center line of the linear track groove surface in the plan view at a location where the distal end and the proximal end meet, and
  wherein the first shape is closer to a final shape than the second shape.

6. The method of forging an outer joint member of a constant velocity universal joint according to claim 1, wherein an outer peripheral surface of the cylindrical portion of the pre-processing material has a protruding portion that is partially projected.

* * * * *